(12) United States Patent
Yip

(10) Patent No.: US 7,917,301 B1
(45) Date of Patent: Mar. 29, 2011

(54) METHOD AND DEVICE FOR IDENTIFYING A BIOLOGICAL SAMPLE

(75) Inventor: Ping Yip, San Diego, CA (US)

(73) Assignee: Sequenom, Inc., San Diego, CA (US)

( * ) Notice: Subject to any disclaimer, the term of this patent is extended or adjusted under 35 U.S.C. 154(b) by 507 days.

(21) Appl. No.: 09/663,968

(22) Filed: Sep. 19, 2000

(51) Int. Cl.
*G01N 33/50* (2006.01)

(52) U.S. Cl. ................. 702/20; 702/19; 702/27; 702/32

(58) Field of Classification Search ............... 702/19; 435/5, 6
See application file for complete search history.

(56) References Cited

U.S. PATENT DOCUMENTS

| | | | |
|---|---|---|---|
| 3,789,203 A | 1/1974 | Catherall et al. | 235/152 |
| 4,031,370 A | 6/1977 | Catherall | 235/152 |
| 4,076,982 A | 2/1978 | Ritter et al. | 250/288 |
| 4,490,806 A | 12/1984 | Enke et al. | 708/445 |
| 4,791,577 A | 12/1988 | Winter | 702/77 |
| 4,826,360 A | 5/1989 | Iwasawa et al. | 406/51 |
| 4,851,018 A | 7/1989 | Lazzari et al. | 55/356 |
| 5,121,337 A | 6/1992 | Brown | 364/498 |
| 5,122,342 A | 6/1992 | McCulloch et al. | 422/65 |
| 5,124,932 A | 6/1992 | Lodder | 702/30 |
| 5,175,430 A | 12/1992 | Enke et al. | 250/282 |
| 5,247,175 A | 9/1993 | Schoen et al. | 250/281 |
| 5,273,718 A | 12/1993 | Sköld et al. | 422/101 |
| 5,363,885 A | 11/1994 | McConnell et al. | 141/1 |
| 5,379,238 A | 1/1995 | Stark | 703/11 |
| 5,428,357 A | 6/1995 | Haab et al. | 341/155 |
| 5,436,447 A * | 7/1995 | Shew | 250/291 |
| 5,440,119 A | 8/1995 | Labowsky | 250/282 |
| 5,453,613 A | 9/1995 | Gray et al. | 250/281 |
| 5,490,516 A | 2/1996 | Hutson | 600/508 |
| 5,498,545 A | 3/1996 | Vestal | 436/47 |
| 5,547,835 A | 8/1996 | Köster | 435/6 |
| 5,572,125 A * | 11/1996 | Dunkel | 324/307 |
| 5,592,402 A | 1/1997 | Beebe et al. | 703/6 |
| 5,605,798 A | 2/1997 | Köster | 435/6 |
| 5,622,824 A | 4/1997 | Köster | 435/6 |
| 5,635,713 A | 6/1997 | Labowsky | 250/282 |
| 5,686,656 A | 11/1997 | Amirav et al. | 73/23.41 |
| 5,691,141 A | 11/1997 | Köster | 435/6 |
| 5,851,765 A | 12/1998 | Köster | 435/6 |
| 5,853,979 A * | 12/1998 | Green et al. | 435/5 |
| 5,869,242 A | 2/1999 | Kamb | 435/6 |
| 5,872,003 A | 2/1999 | Köster | 435/283.1 |
| 5,885,841 A | 3/1999 | Higgs, Jr. et al. | 436/89 |
| 5,900,481 A | 5/1999 | Lough et al. | 636/55.3 |
| 5,928,906 A | 7/1999 | Köster et al. | 435/91.2 |
| 5,928,952 A | 7/1999 | Hutchins et al. | 436/50 |
| 5,975,492 A | 11/1999 | Brenes | 251/175 |
| 5,985,214 A | 11/1999 | Stylli et al. | 422/65 |
| 5,995,989 A | 11/1999 | Gedcke et al. | 708/300 |
| 6,017,693 A | 1/2000 | Yates, III et al. | 435/5 |
| 6,022,688 A | 2/2000 | Jurinke et al. | 435/6 |
| 6,024,925 A | 2/2000 | Little et al. | 422/100 |
| 6,043,031 A | 3/2000 | Köster et al. | 435/6 |
| 6,060,022 A | 5/2000 | Pang et al. | 422/65 |
| 6,094,050 A | 7/2000 | Zaroubi et al. | 324/309 |
| 6,111,251 A | 8/2000 | Hillenkamp | 250/288 |
| 6,132,685 A | 10/2000 | Kercso et al. | 422/104 |
| 6,133,436 A | 10/2000 | Köster et al. | 536/24.3 |
| 6,140,053 A | 10/2000 | Köster | 435/6 |
| 6,146,854 A | 11/2000 | Köster et al. | 435/1.1 |
| 6,147,344 A | 11/2000 | Annis et al. | 250/281 |
| 6,188,064 B1 | 2/2001 | Koster | 250/282 |
| 6,270,835 B1 | 8/2001 | Hunt et al. | 427/79 |
| 6,440,705 B1 * | 8/2002 | Stanton et al. | 435/91.2 |
| 6,586,728 B1 * | 7/2003 | Gavin et al. | 250/287 |
| 2002/0009394 A1 | 1/2002 | Koster et al. | 422/65 |

FOREIGN PATENT DOCUMENTS

| | | |
|---|---|---|
| EP | 0296781 | 6/1988 |
| EP | 0299652 | 1/1989 |
| EP | 0395481 | 10/1990 |
| EP | 0596205 | 5/1994 |
| FR | 2749662 | 12/1997 |
| GB | 2329475 | 3/1999 |
| WO | 9315407 | 8/1993 |
| WO | 9321592 | 10/1993 |
| WO | 9416101 | 7/1994 |
| WO | 9421822 | 9/1994 |
| WO | 9629431 | 9/1996 |
| WO | 9708306 | 3/1997 |
| WO | 9737041 | 10/1997 |
| WO | 9742348 | 11/1997 |

(Continued)

OTHER PUBLICATIONS

Cai et al. Different Discrete Wavelet Transforms Applied to Denoising Analytical Data. J. Chem. Inf Comput. Sci. vol. 38, No. 6, 1998, pp. 1161-1170.*
Sehgal et al. Isolation and characterization of a novel gene from human glioblastoma multiforme tumor tissue. International Journal of Cancer. 1997, vol. 71, p. 565-572.*
Gevaert et al. Electrophoresis, vol. 21, p. 1145-1154, 2000.*
Wilkes et al., Rapid Communications in Mass Spectroscopy, vol. 20, p. 1595-1603, 2006.*
Bonk et al., Neuroscientist, vol. 7, Iss. 1, p. 6-12, 2001.*
Lay, Mass Spectrometry Reviews, vol. 20, p. 172-194, 2001.*
Ferrige et al. (Rapid Communication in Mass Spectrometry, vol. 5, p. 374-377, 1991).*
Ferrige et al. (Rapid Communication in Mass Spectrometry, vol. 6, p. 765-770, 1992).*
Zauber et al., Molecular Diagnosis, vol. 4, No. 1, p. 29-35, 1999.*
Gull et al. (IEEE Proc., vol. 131, Pt. F, No. 6, p. 646-659, Oct. 1984).*
Leung et al. (Anal. Chem., vol. 70, p. 5222-5229, 1998).*
Croft et al. (Journal of Biomolecular NMR, vol. 10, p. 207-219, 1997).*

(Continued)

*Primary Examiner* — Karlheinz R Skowronek
(74) *Attorney, Agent, or Firm* — Grant Anderson LLP.

(57) ABSTRACT

The method and system for identifying a biological sample generates a data set indicative of the composition of the biological sample. In a particular example, the data set is DNA spectrometry data received from a mass spectrometer. The data set is denoised, and a baseline is deleted. Since possible compositions of the biological sample may be known, expected peak areas may be determined. Using the expected peak areas, a residual baseline is generated to further correct the data set. Probable peaks are then identifiable in the corrected data set, which are used to identify the composition of the biological sample. In a disclosed example, statistical methods are employed to determine the probability that a probable peak is an actual peak, not an actual peak, or that the data are too inconclusive to call.

9 Claims, 20 Drawing Sheets

FOREIGN PATENT DOCUMENTS

| WO | 9743617 | 11/1997 |
|---|---|---|
| WO | 9812734 | 3/1998 |
| WO | 9820019 | 5/1998 |
| WO | 9820020 | 5/1998 |
| WO | 9820166 | 5/1998 |
| WO | WO 98/20166 | 5/1998 |
| WO | 9833808 | 8/1998 |
| WO | 9912040 | 3/1999 |
| WO | 9931278 | 6/1999 |
| WO | 9957318 | 11/1999 |
| WO | 0056446 | 9/2000 |
| WO | 0060361 | 10/2000 |
| WO | 0127857 | 4/2001 |

OTHER PUBLICATIONS

Mir et al.(Annual review of Genomics and Human Genetics vol. 1, 329-360, 2000).*

Nelson, S.J. and T.R. Brown, "Accuracy of Quantification from 1D NMR Spectra Using the PIQABLE Algorithm," *Journal of Magnetic Resonance* 84: 95-109 (1989).

Polettini et al. "Fully-automated systematic toxicological analysis of drugs, poisons, and metabolites in whole blood, urine, and plasma by gas chromatography-full scan mass spectrometry," *Journal of Chromatography B* 713: 265-279 (1998).

Thompson, J.N.,"Fitting Robots with white coat," *Laboratory Automation and Information Management* 31:173-193 (1996).

Li et al., "De-noising ENMR spectra by wavelet shrinkage," *Proceedings of the 11th IEEE Symposium on Computer-Based Medical Systems. CBMS '98*. Lubbock, TX, Jun. 12-14, 1998, IEEE Symposium on Computer-Based Medical Systems, Los Alamitos, CA: IEEE Computer Soc. US, Jun. 12, 1998. pp. 252-255.

Norris et al., "Real-time compression of myoelectric data utilising adaptive differential pulse code modulation", *Med. Biol. Eng. Comput.*, Peter Peregrinus LTD.Stevenage, GB. 33(5): 629-635 (1995).

Bessant et al., "Integrated processing of triply coupled diode array liquid chromatography electrospray mass spectrometric signals by chemometric methods", *Analysis*, 124:1733-1744 (1999).

Bluck et al., "Peak Measurement in Gas Chromatographic/Mass Spectrometric Isotope Studies", *J. Mass Spectrometry*, 32:1212-1218 (1997).

Hindmarch, et al. "Deconvolution and Spectral Clean-up of Two-component Mixtures by Factor Analysis of Gas Chromatographic-Mass Spectrometric Data", *Analyst*(August), 121:993-1001 (1996).

European Patent Office, Office Action for EP 00918447.4 dated Jan. 7, 2008.

Badger et al., New features and enhancements in the X-PLOR computer program, *Proteins* 35(1):25-33 (1999).

Braun et al., Improved analysis of microsatellites using mass spectrometry, *Genomics* 46(10:18-23 (1997).

Database WPI, Derwent publication # 011635345 citing International Patent Application WO 9747974 of the parent French Patent Application FR 2,749,662.

Goldmacher et al., Photoactivation of toxin conjugates, *Bioconj. Chem.* 3:104-107 (1992).

Hazum et al., A photocleavable protecting group for the thiol function of cysteine, in *Pept., Proc. Eur. Pept. Symp., 16th* Brunfeldt, K (ed), pp. 105-110- (1981).

Hinton et al., "The application of robotics to fluorometric and isotopic analyses of uranium.", Laboratory Automation & Information Management, NL, Elsevier Science publishers BV., Amsterdam, vol. 21 No. 2/03, pp. 223-227, Dec. 1, 1993.

Instrumentation; Bar code systems, including one and two dimensional bar codes, readable and readable/writable codes and systems; Datalogic S.p.A. of Italy ("Datalogic") located at http://www.datalogic.com.

Instrumentation; Dynabeads, streptavidin-coated magnetic beads; from Dynal, Inc. Great Neck, NY and Oslo Norway.

Instrumentation; "MJ Microseal" plate sealer; Thermal Cycler Accessories: Sealing Options, Sealing Products, MJ Research, located at http://www.mjresearch.com/html/consumables/ealing/sealing_products.html.

Instrumentation; "Multimek 96" automated pipettor; Beckman Coulter, Inc. located at http://www.coulter.com, Sep. 8, 1999.

Instrumentation; "Model CRS A 255" robot "Digital Servo Gripper" "Plate Cube" system. "lid parking station" "shaker" Robocon Labor- und Industrieroboter Ges.m.b.H of Austria ("Robocon").

Instrumentation; "Nano-Plotter" from GeSiM, Germany, located at http:/www.gesim.de/np-intro.htm.

Instrumentation; "Genesis 200/8" (200 cm with including an 8-tip arm) liquid handling systems; TECAN AG of Switzerland ("Tecan"), Tecan Products for Diagnostics and Life Science, located at http://www.tecan.ch/index.htm.

International Search Report for International Application No. PCT/US00/08111, Date of Mailing Nov. 11, 2000.

Little et al., MALDI on a chip: analysis of arrays of low-femtomole to subfemtomole quantities of synthetic oligonucleotides and DNA diagnostic products dispensed by a piezoelectric pipet, *Anal. Chem.* 69:4540-4546 (1997).

Little et al., Identification of apolipoprotein E polymorphisms using temperature cycled primer oligo base extension and mass spectrometry, *Eur J clin Chem Clin Biochem* 35(7):545-8 (1997).

Nelson, S.J. and T.R. Brown, "The accuracy of Quantification from 1D NMR Spectra Using the PIQABLE Algorithm," *Journal of Magnetic Resonance* 84:95-109 (1989).

Nilges et al., Automated NOESY interpretation with ambiguous distance restraints: the refined NMR solution structure of the pleckstrin homology domain from β-spectrin, *J. Mol. Biol.* 269:408-422 (1997).

Senko et al., Automated Assignment of Charge States from Resolved Isotopic Peaks for Multiply Charged Ions, *J. Am. Soc. Mass Spectrom* 6:52-56 (1995).

Senter et al., Novel photocleavable protein crosslinking reagents and their use in the preparation of antibody-toxin conjugates, *Photochem. Photobiol.* 42:231-237 (1985).

Sequenom Advances the Industrial Genomics Revolution with the Launch of Its DNA MassArray™ Automated Process Line, Press Release: Sep. 28, 1998, http://www.sequenom.com/pressrelease.htm.

Sequenom: Technologies and Tools, located at http://www.sequenomsan.com/tech/tools.html, dated Aug. 29, 1999.

Tammen et al., Proteolytic cleavage of glucagon-like peptide-1 by pancreatic β cells and by fetal calf serum analyzed by mass spectrometry, *J. Cromatogr. A* 852:285-295 (1999).

Thompson, Fitting robots with white coats, *Laboratory Automation and Information Management* 31:173-193 (1996).

Wang et al., Allene $y_9$ and $y_{10}$: low-temperature measurements of line intensity, *J Mol Spectrosc* 194(20:256-268 (1999).

Weiler et al.,Hybridisation based DNA screening on peptide nucleic acid (PNA) oligomer arrays, *Nucleic Acids Res.* 25:2792-2799 (1997).

Yen et al., Synthesis of water-soluble copolymers containing photocleavable bonds, *Makromol. Chem.* 190:69-82 (1989).

* cited by examiner

SIGNAL (t) = $\frac{(\text{START 0(t)} + \text{START 1(t)} + \text{START 2(t)}... + \text{START 23(t)})}{24}$

| NON-0 COEFFICIENTS | VALUE | INTERMEDIATE | RELATIVE |
|---|---|---|---|
| 100 | 25 | 100.025 | 100.025 |
| 150 | 220 | 150.220 | 50.220 |
| 500 | .1 | 500.0001 | 350.0001 |
| 10,050 | 800 | 10,050.8 | 9550.8 |
| 10,075 | 890 | 10,075.89 | 25.89 |
| 11,125 | 910 | 11,125.91 | 150.91 |
| 12,100 | 1000 (MAX) | 12,100.99999 | 975.99999 |
| 13,250 | 940 | 13,250.94 | 1150.94 |

METHOD AND DEVICE FOR IDENTIFYING A BIOLOGICAL SAMPLE

This application is related to U.S. patent application Ser. No. 09/285,481, filed Apr. 2, 1999, and entitled "Automated Process Line", which is referred to and incorporated herein in its entirety by this reference.

FIELD OF THE INVENTION

The present invention is in the field of biological identification. More specifically, the present invention relates to identifying a biological sample by analyzing information received from a test instrument.

BACKGROUND OF THE INVENTION

Advances in the field of genomics are leading to the discovery of new and valuable information regarding genetic processes and relationships. This newly illuminated genetic information is revolutionizing the way medical therapies are advanced, tested, and delivered. As more information is gathered, genetic analysis has the potential to play an integral and central role in developing and delivering medical advancements that will significantly enhance the quality of life.

With the increasing importance and reliance on genetic information, the accurate and reliable collection and processing of genetic data is critical. However, conventional known systems for collecting and processing genetic or DNA data are inadequate to support the informational needs of the genomics community. For example, known DNA collection systems often require substantial human intervention, which undesirably risks inaccuracies associated with human intervention. Further, the slow pace of such a manual task severely limits the quantity of data that can be collected in a given period of time, which slows needed medical advancements and adds substantially to the cost of data collection.

In a particularly exciting area of genomics, the identification and classification of minute variations in human DNA has been linked with fundamental treatment or medical advice for a specific individual. For example, the variations are a strong indication of predisposition for a particular disease, drug tolerance, and drug efficiency. The most promising of these minute variations are commonly referred to as Single Nucleotide Polymorphisms (SNPs), which relate to a single base-pair change between a first subject and a second subject. By accurately and fully identifying such SNPs, a health care provider would have a powerful indication of a person's likelihood of succumbing to a particular disease, which drugs will be most effective for that person, and what drug treatment plan will be most beneficial. Armed with such knowledge, the health care provider can assist a person in lowering other risk factors for high-susceptibility diseases. Further, the health care provider can confidently select appropriate drug therapies, a process which is now an iterative, hit or miss process where different drugs and treatment schedules are tried until an effective one is found. Not only is this a waste of limited medical resources, but the time lost in finding an effective therapy can have serious medical consequences for the patient.

In order to fully benefit from the use of SNP data, vast quantities of DNA data must be collected, compared, and analyzed. For example, collecting and identifying the SNP profile for a single human subject requires the collection, identification, and classification of thousands, even tens of thousands of DNA samples. Further, the analysis of the resulting DNA data must be carried out with precision. In making a genetic call, where a composition of a biological sample is identified, any error in the call may result in detrimentally affecting the medical advice or treatment given to a patient.

Conventional, known systems and processes for collecting and analyzing DNA data are inadequate to timely and efficiently implement a widespread medical program benefiting from SNP information. For example, many known DNA analysis techniques require the use of an operator or technician to monitor and review the DNA data. An operator, even with sufficient training and substantial experience, is still likely to occasionally make a classification error. For example, the operator may incorrectly identify a base-pair, leading to that patient receiving faulty SNP profile. Alternatively, the operator may view the data and decide that the data do not clearly identify any particular base pair. Although such a "no call" may be warranted, it is likely that the operator will make "no-call" decisions when the data actually support a valid call. In such a manner, the opportunity to more fully profile the patient is lost.

Therefore, there exists a need for a system and process to efficiently and accurately collect and analyze data, such as DNA data.

SUMMARY OF THE INVENTION

It is an object of the present invention to provide an apparatus and process for accurately identifying genetic information. It is another object of the present invention that genetic information be extracted from genetic data in a highly automated manner. Therefore, to overcome the deficiencies in the known conventional systems, a method and apparatus for identifying a biological sample is proposed.

Briefly, the method and system for identifying a biological sample generates a data set indicative of the composition of the biological sample. In a particular example, the data set is DNA spectrometry data received from a mass spectrometer. The data set is denoised, and a baseline is deleted. Since possible compositions of the biological sample may be known, expected peak areas may be determined. Using the expected peak areas, a residual baseline is generated to further correct the data set. Probable peaks are then identifiable in the corrected data set, which are used to identify the composition of the biological sample. In a disclosed example, statistical methods are employed to determine the probability that a probable peak is an actual peak, not an actual peak, or that the data are too inconclusive to call.

Advantageously, the method and system for identifying a biological sample accurately makes composition calls in a highly automated manner. In such a manner, complete SNP profile information, for example, may be collected efficiently. More importantly, the collected data are analyzed with highly accurate results. For example, when a particular composition is called, the result may be relied upon with great confidence. Such confidence is provided by the robust computational process employed and the highly automatic method of collecting, processing, and analyzing the data set.

These and other features and advantages of the present invention will be appreciated from review of the following detailed description of the invention, along with the accompanying figures in which like reference numerals refer to like parts throughout.

DETAILED DESCRIPTION OF THE INVENTION

Figure 1:
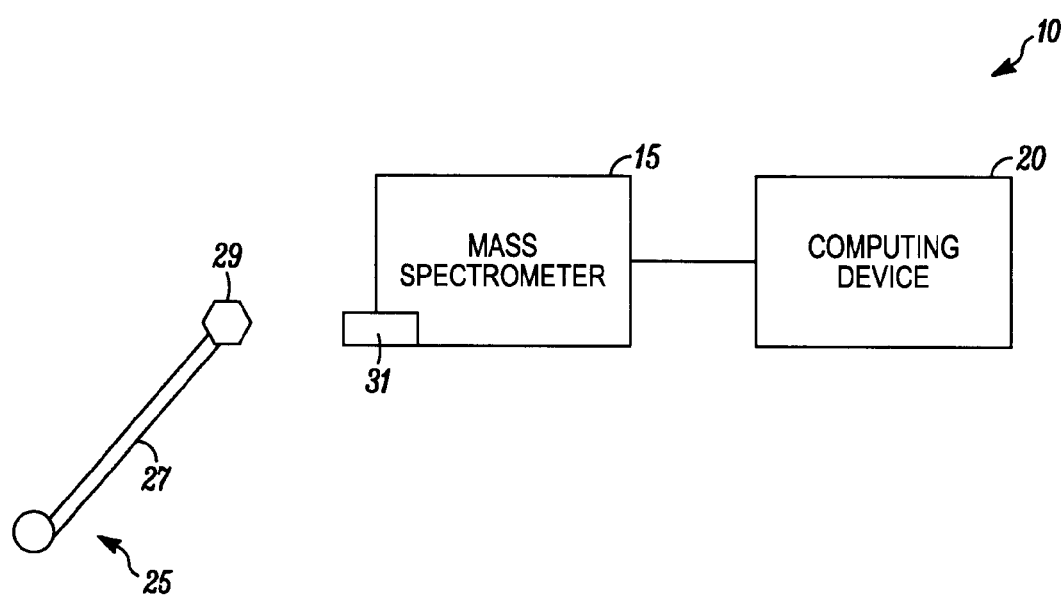
FIG. 1 is a block diagram showing a system in accordance with the present invention.

In accordance with the present invention, a method and device for identifying a biological sample is provided. Referring now to FIG. 1, an apparatus 10 for identifying a biological sample is disclosed. The apparatus 10 for identifying a biological sample generally comprises a mass spectrometer 15 communicating with a computing device 20. In a preferred embodiment, the mass spectrometer may be a MALDI-TOF mass spectrometer manufactured by Bruker-Franzen Analytik GmbH; however, it will be appreciated that other mass spectrometers can be substituted. The computing device 20 is preferably a general purpose computing device. However, it will be appreciated that the computing device could be alternatively configured; for example, it may be integrated with the mass spectrometer or could be part of a computer in a larger network system.

The apparatus 10 for identifying a biological sample may operate as an automated identification system having a robot 25 with a robotic arm 27 configured to deliver a sample plate 29 into a receiving area 31 of the mass spectrometer 15. In such a manner, the sample to be identified may be placed on the plate 29 and automatically received into the mass spectrometer 15. The biological sample is then processed in the mass spectrometer to generate data indicative of the mass of DNA fragments into biological sample. These data may be sent directly to computing device 20, or may have some preprocessing or filtering performed within the mass spectrometer. In a preferred embodiment, the mass spectrometer 15 transmits unprocessed and unfiltered mass spectrometry data to the computing device 20. However, it will be appreciated that the analysis in the computing device may be adjusted to accommodate preprocessing or filtering performed within the mass spectrometer.

Figure 2:
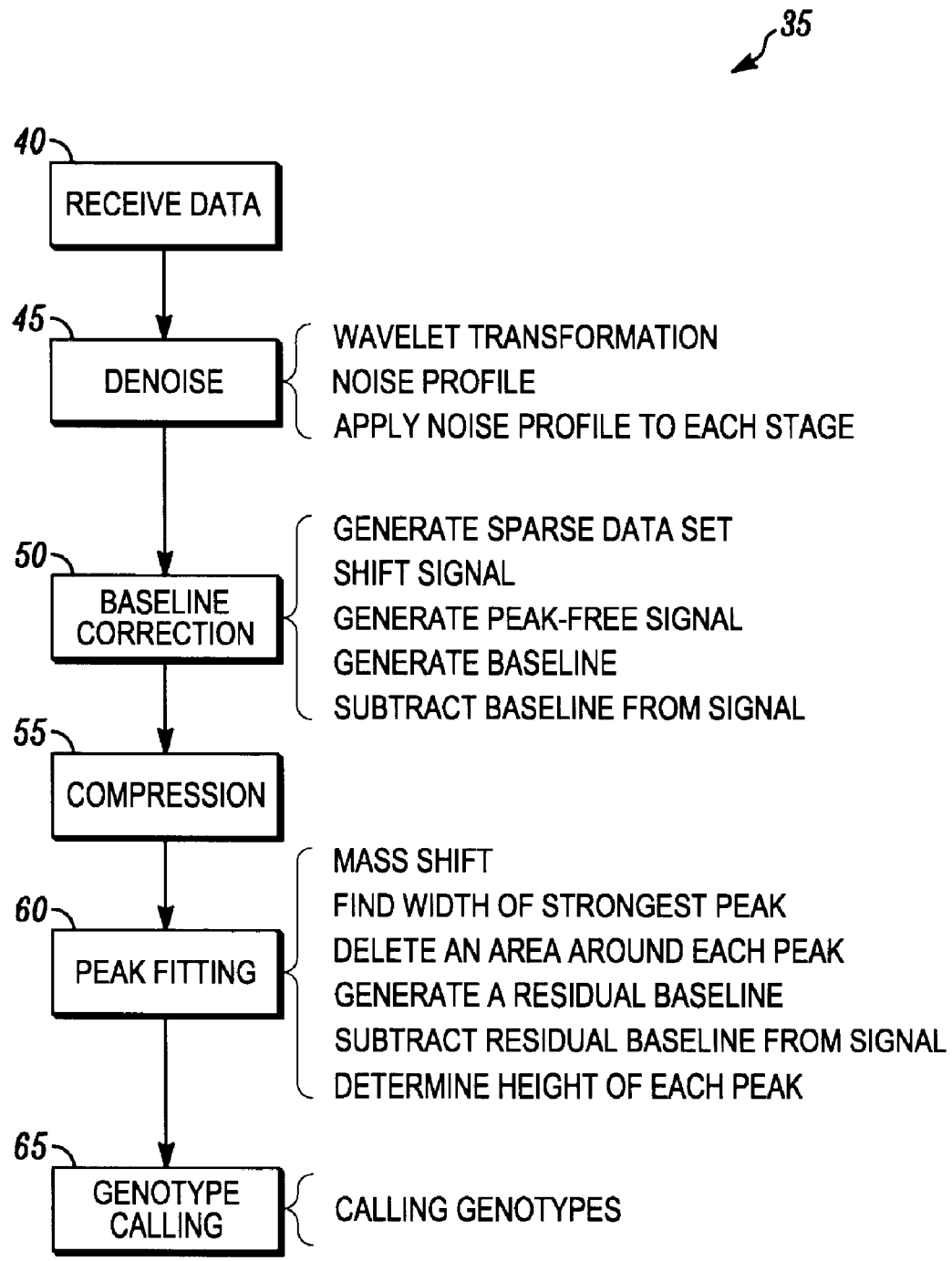
FIG. 2 is a flowchart of a method of identifying a biological sample in accordance with the present invention.

Referring now to FIG. 2, a general method 35 for identifying a biological sample is shown. In method 35, data are received into a computing device from a test instrument in block 40. Preferably the data are received in a raw, unprocessed and unfiltered form, but alternatively may have some form of filtering or processing applied. The test instrument of a preferred embodiment is a mass spectrometer as described above. However, it will be appreciated that other test instruments could be substituted for the mass spectrometer.

The data generated by the test instrument, and in particular the mass spectrometer, include information indicative of the identification of the biological sample. More specifically, the data are indicative of the DNA composition of the biological sample. Typically, mass spectrometry data gathered from DNA samples obtained from DNA amplification techniques are noisier than, for example, those from typical protein samples. This is due in part because protein samples are more readily prepared in more abundance, and protein samples are more easily ionizable as compared to DNA samples. Accordingly, conventional mass spectrometer data analysis techniques are generally ineffective for DNA analysis of a biological sample.

To improve the analysis capability so that DNA composition data can be more readily discerned, a preferred embodiment uses wavelet technology for analyzing the DNA mass spectrometry data. Wavelets are an analytical tool for signal processing, numerical analysis, and mathematical modeling. Wavelet technology provides a basic expansion function which is applied to a data set. Using wavelet decomposition, the data set can be simultaneously analyzed in both the time and frequency domains. Wavelet transformation is the technique of choice in the analysis of data that exhibit complicated time (mass) and frequency domain information, such as MALDI-TOF DNA data. Wavelet transforms as described herein have superior denoising properties as compared to conventional Fourier analysis techniques. Wavelet transformation has proven to be particularly effective in interpreting the inherently noisy MALDI-TOF spectra of DNA samples. In using wavelets, a "small wave" or "scaling function" is used to transform a data set into stages, with each stage representing a frequency component in the data set. Using wavelet transformation, mass spectrometry data can be processed, filtered, and analyzed with sufficient discrimination to be useful for identification of the DNA composition for a biological sample.

Referring again to FIG. 2, the data received in block 40 are denoised in block 45. The denoised data then has a baseline correction applied in block 50. A baseline correction is generally necessary as data coming from the test instrument, in particular a mass spectrometer instrument, has data arranged in a generally exponentially decaying manner. This generally exponential decaying arrangement is not due to the composition of the biological sample, but is a result of the physical properties and characteristics of the test instrument and other chemicals involved in DNA sample preparation. Accordingly, baseline correction substantially corrects the data to remove a component of the data attributable to the test system and sample preparation characteristics.

After denoising in block 45 and the baseline correction in block 50, a signal remains which is generally indicative of the composition of the biological sample. However, due to the extraordinary discrimination required for analyzing the DNA composition of the biological sample, the composition is not readily apparent from the denoised and corrected signal. For example, although the signal may include peak areas, it is not yet clear whether these "putative" peaks actually represent a DNA composition, or whether the putative peaks are result of a systemic or chemical aberration. Further, any call of the composition of the biological sample would have a probability of error which would be unacceptable for clinical or therapeutic purposes. In such critical situations, there needs to be a high degree of certainty that any call or identification of the sample is accurate. Therefore, additional data processing and interpretation are necessary before the sample can be accurately and confidently identified.

Since the quantity of data resulting from each mass spectrometry test is typically thousands of data points, and an automated system may be set to perform hundreds or even thousands of tests per hour, the quantity of mass spectrometry data generated is enormous. To facilitate efficient transmission and storage of the mass spectrometry data, block 55 shows that the denoised and baseline corrected data are compressed.

In a preferred embodiment, the biological sample is selected and processed to have only a limited range of possible compositions. Accordingly, it is therefore known where peaks indicating composition should be located, if present. Taking advantage of knowing the location of these expected peaks, in block 60 the method 35 matches putative peaks in the processed signal to the location of the expected peaks. In such a manner, the probability of each putative peak in the data being an actual peak indicative of the composition of the biological sample can be determined. Once the probability of each peak is determined in block 60, then in block 65 the method 35 statistically determines the composition of the biological sample, and determines if confidence is high enough to calling a genotype.

Figure 3:
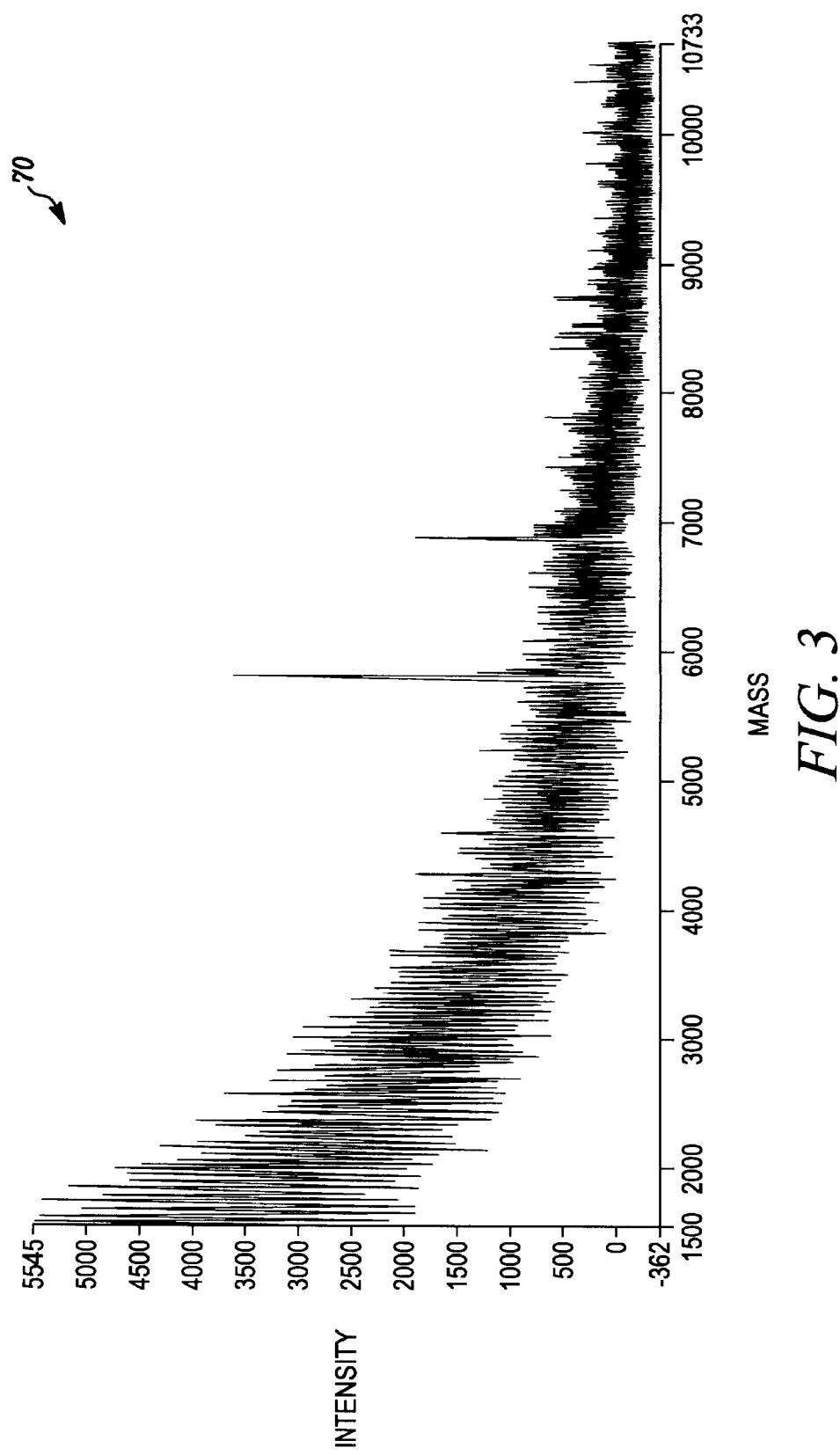
FIG. 3 is a graphical representation of data from a mass spectrometer.

Referring again to block 40, data are received from the test instrument, which is preferably a mass spectrometer. In a specific illustration, FIG. 3 shows an example of data from a mass spectrometer. The mass spectrometer data 70 generally comprises data points distributed along an x-axis and a y-axis. The x-axis represents the mass of particles detected, while the y-axis represents a numerical concentration of the particles. As can be seen in FIG. 3, the mass spectrometry data 70 is generally exponentially decaying with data at the left end of the x-axis generally decaying in an exponential manner toward data at the heavier end of the x-axis. However, the general exponential presentation of the data is not indicative of the composition of the biological sample, but is more reflective of systematic error and characteristics. Further, as described above and illustrated in FIG. 3, considerable noise exists in the mass spectrometry DNA data 70.

Referring again to block 45, where the raw data received in block 40 is denoised, the denoising process will be described in more detail. As illustrated in FIG. 2, the denoising process generally entails 1) performing a wavelet transformation on the raw data to decompose the raw data into wavelet stage coefficients; 2) generating a noise profile from the highest stage of wavelet coefficients; and 3) applying a scaled noise profile to other stages in the wavelet transformation. Each step of the denoising process is further described below.

Figure 4:
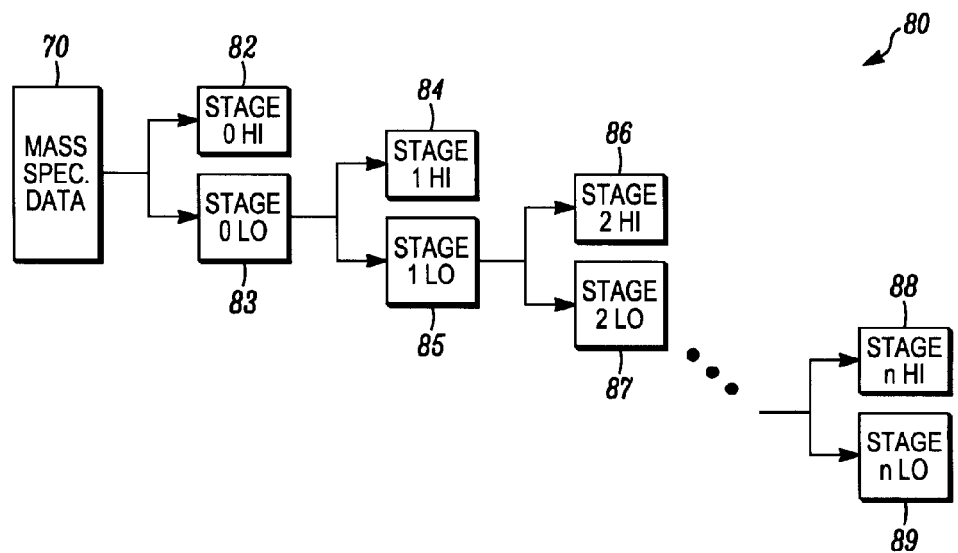
FIG. 4 is a diagram of wavelet transformation of mass spectrometry data.

Referring now to FIG. 4, the wavelet transformation of the raw mass spectrometry data is generally diagramed. Using wavelet transformation techniques, the mass spectrometry data 70 is sequentially transformed into stages. In each stage the data is represented in a high stage and a low stage, with the low stage acting as the input to the next sequential stage. For example, the mass spectrometry data 70 is transformed into stage 0 high data 82 and stage 0 low data 83. The stage 0 low data 83 is then used as an input to the next level transformation to generate stage 1 high data 84 and stage 1 low data 85. In a similar manner, the stage 1 low data 85 is used as an input to be transformed into stage 2 high data 86 and stage 2 low data 87. The transformation is continued until no more useful information can be derived by further wavelet transformation. For example, in the preferred embodiment a 24-point wavelet is used. More particularly a wavelet commonly referred to as the Daubechies 24 is used to decompose the raw data. However, it will be appreciated that other wavelets can be used for the wavelet transformation. Since each stage in a wavelet transformation has one-half the data points of the previous stage, the wavelet transformation can be continued until the stage n low data 89 has around 50 points. Accordingly, the stage n high 88 would contain about 100 data points. Since the preferred wavelet is 24 points long, little data or information can be derived by continuing the wavelet transformation on a data set of around 50 points.

Figure 5:
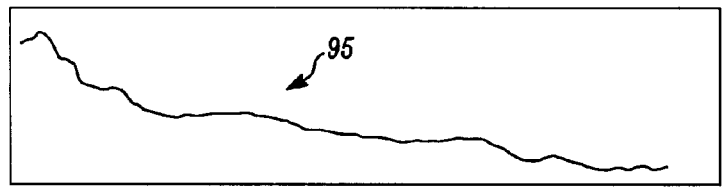
FIG. 5 is a graphical representation of wavelet stage 0 hi data.
Figure 6:
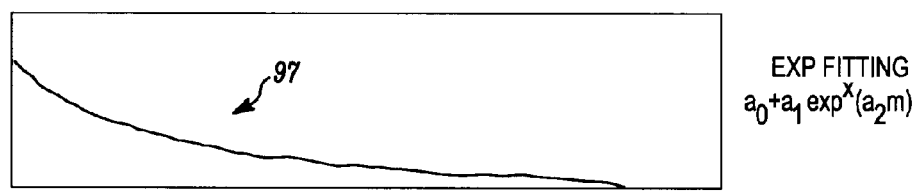
FIG. 6 is a graphical representation of stage 0 noise profile.

FIG. 5 shows an example of stage 0 high data 95. Since stage 0 high data 95 is generally indicative of the highest frequencies in the mass spectrometry data, stage 0 high data 95 will closely relate to the quantity of high frequency noise in the mass spectrometry data. In FIG. 6, an exponential fitting formula has been applied to the stage 0 high data 95 to generate a stage 0 noise profile 97. In particular, the exponential fitting formula is in the format $A_0 + A_1 \text{EXP}(-A_2 m)$. It will be appreciated that other exponential fitting formulas or other types of curve fits may be used.

Figure 7:
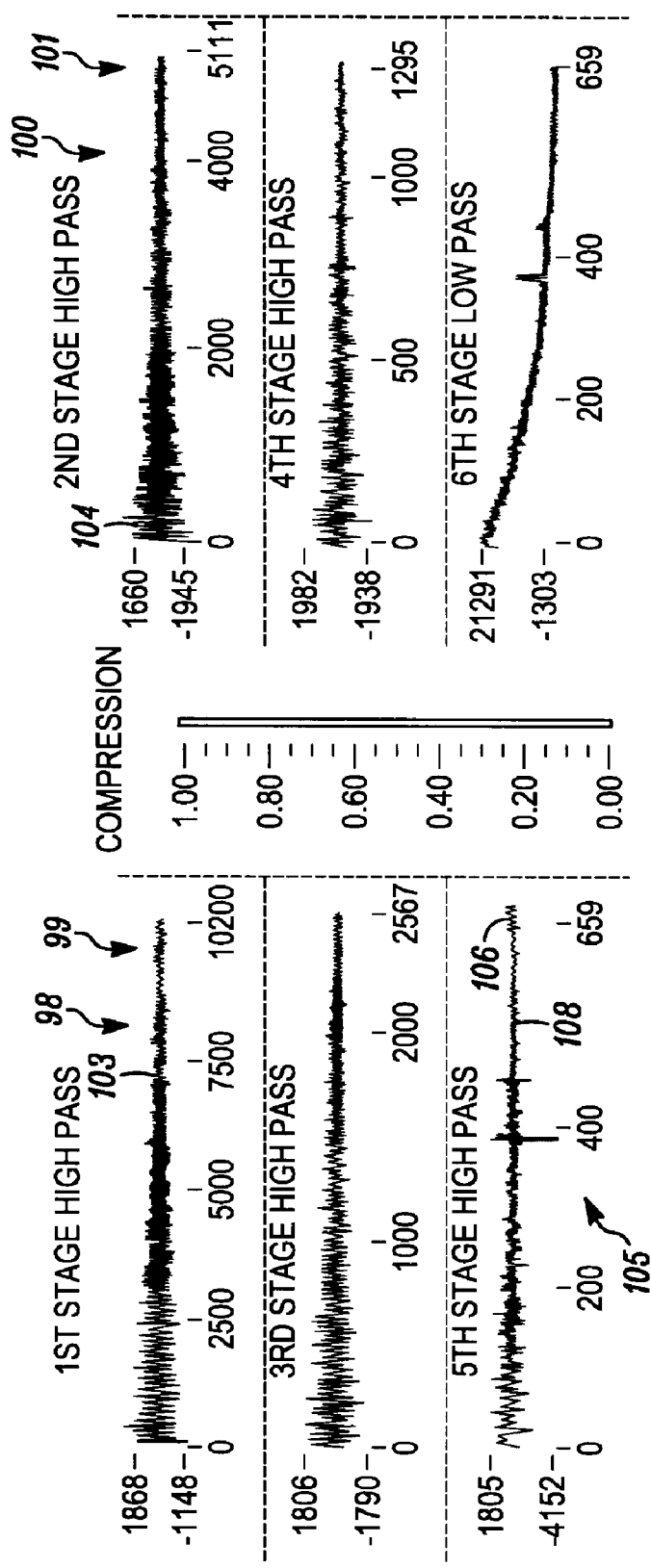
FIG. 7 is a graphical representation of generating stage noise standard deviations.

Referring now to FIG. 7, noise profiles for the other high stages are determined. Since the later data points in each stage will likely be representative of the level of noise in each stage, only the later data points in each stage are used to generate a standard deviation figure that is representative of the noise content in that particular stage. More particularly, in generating the noise profile for each remaining stage, only the last five percent of the data points in each stage are analyzed to determine a standard deviation number. It will be appreciated that other numbers of points, or alternative methods could be used to generate such a standard deviation figure.

The standard deviation number for each stage is used with the stage 0 noise profile (the exponential curve) 97 to generate a scaled noise profile for each stage. For example, FIG. 7 shows that stage 1 high data 98 has stage 1 high data 103 with the last five percent of the data points represented by area 99. The points in area 99 are evaluated to determine a standard deviation number indicative of the noise content in stage 1 high data 103. The standard deviation number is then used with the stage 0 noise profile 97 to generate a stage 1 noise profile.

In a similar manner, stage 2 high 100 has stage 2 high data 104 with the last five percent of points represented by area 101. The data points in area 101 are then used to calculate a standard deviation number which is then used to scale the stage 0 noise profile 97 to generate a noise profile for stage 2 data. This same process is continued for each of the stage high data as shown by the stage n high 105. For stage n high 105, stage n high data 108 has the last five percent of data points indicated in area 106. The data points in area 106 are used to determine a standard deviation number for stage n. The stage n standard deviation number is then used with the stage 0 noise profile 97 to generate a noise profile for stage n. Accordingly, each of the high data stages has a noise profile.

Figure 8:
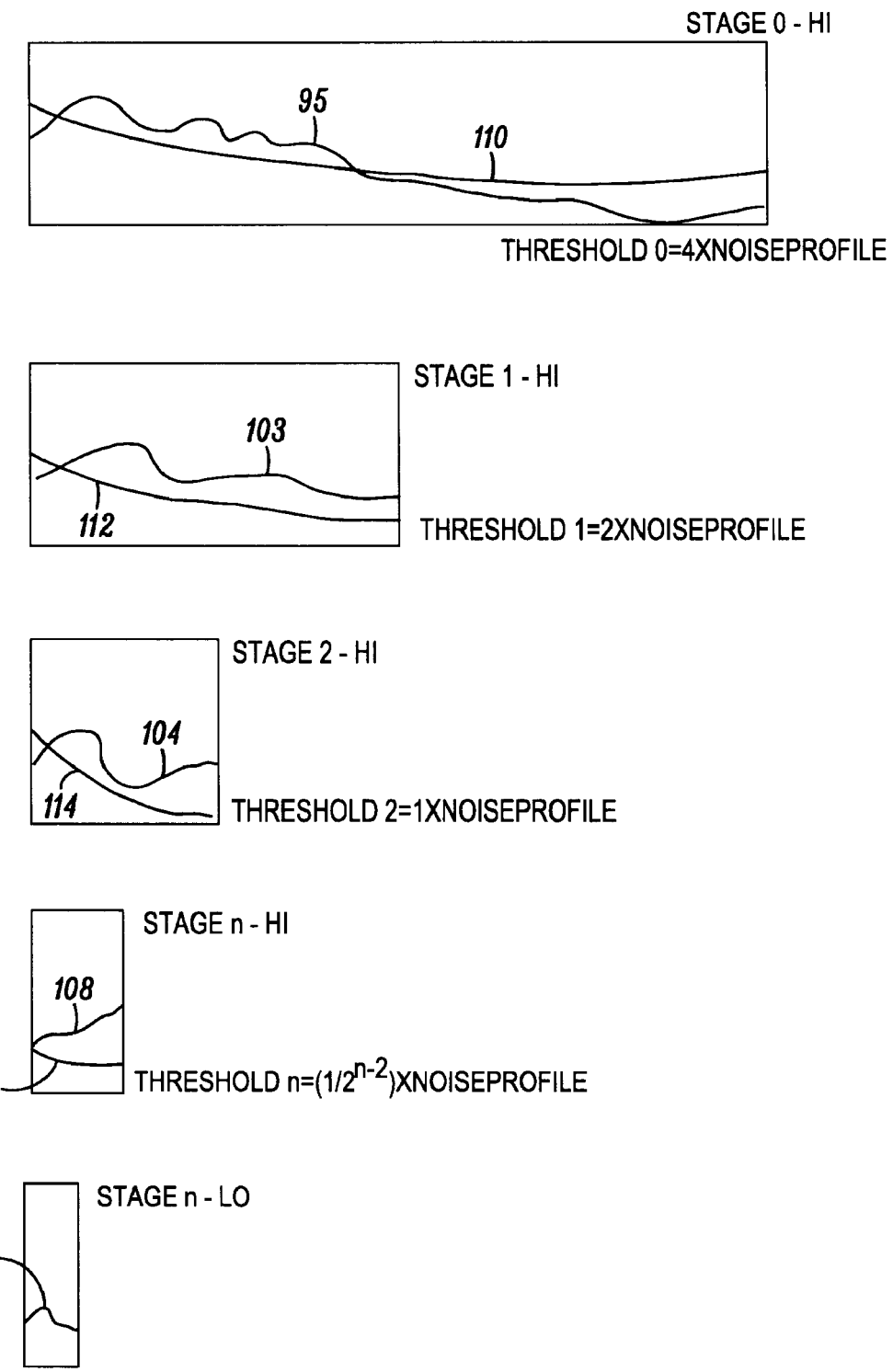
FIG. 8 is a graphical representation of applying a threshold to data stages.

FIG. 8 shows how the noise profile is applied to the data in each stage. Generally, the noise profile is used to generate a threshold which is applied to the data in each stage. Since the noise profile is already scaled to adjust for the noise content of each stage, calculating a threshold permits further adjustment to tune the quantity of noise removed. Wavelet coefficients below the threshold are ignored while those above the threshold are retained. Accordingly, the remaining data has a substantial portion of the noise content removed.

Figure 9:
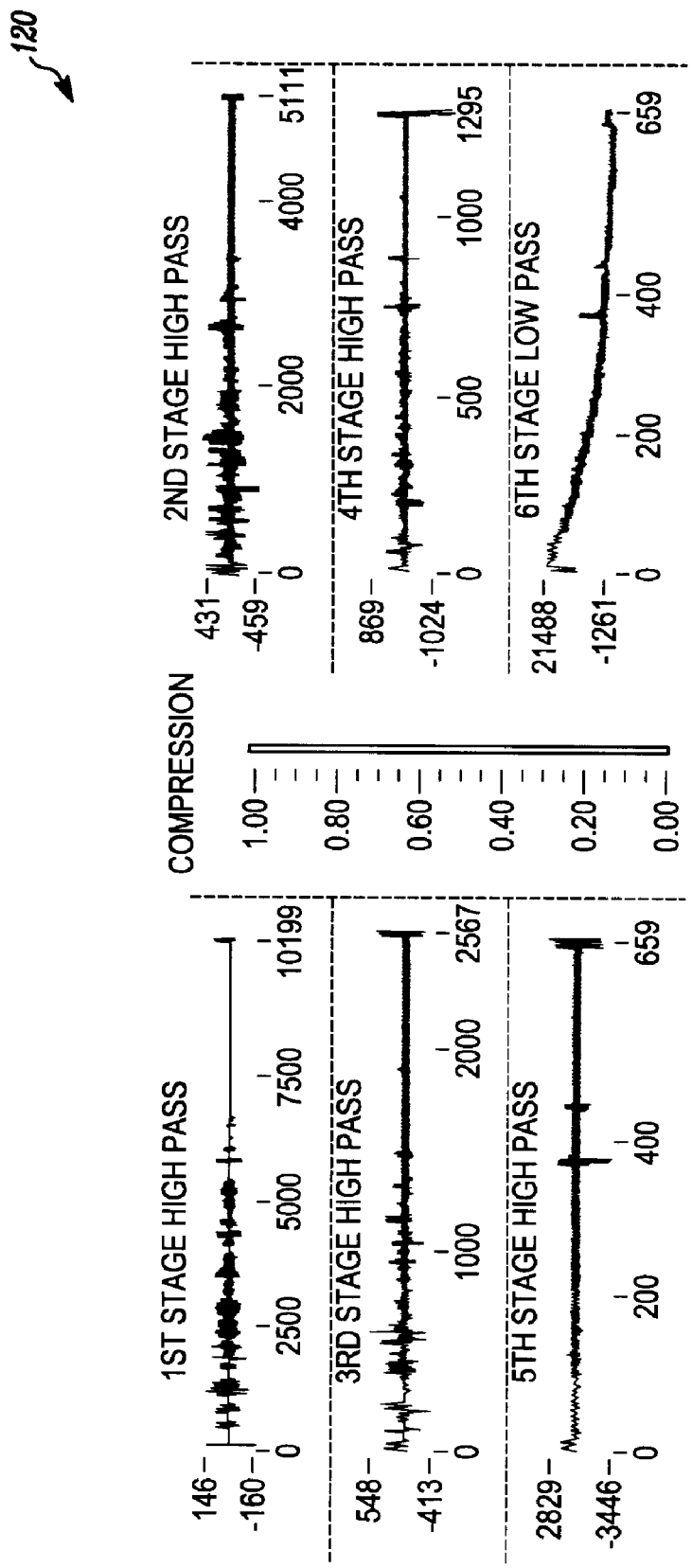
FIG. 9 is a graphical representation of a sparse data set.

Due to the characteristics of wavelet transformation, the lower stages, such as stage 0 and 1, will have more noise content than the later stages such as stage 2 or stage n. Indeed, stage n low data is likely to have little noise at all. Therefore, in a preferred embodiment the noise profiles are applied more aggressively in the lower stages and less aggressively in the later stages. For example, FIG. 8 shows that stage 0 high threshold is determined by multiplying the stage 0 noise profile by a factor of four. In such a manner, significant numbers of data points in stage 0 high data 95 will be below the threshold and therefore eliminated. Stage 1 high threshold 112 is set at two times the noise profile for the stage 1 high data, and stage 2 high threshold 114 is set equal to the noise profile for stage 2 high. Following this geometric progression, stage n high threshold 116 is therefore determined by scaling the noise profile for each respective stage n high by a factor equal to $(\frac{1}{2}^{n-2})$. It will be appreciated that other factors may be applied to scale the noise profile for each stage. For example, the noise profile may be scaled more or less aggressively to accommodate specific systemic characteristics or sample compositions. As indicated above, stage n low data does not have a noise profile applied as stage n low data 118 is assumed to have little or no noise content. After the scaled noise profiles have been applied to each high data stage, the mass spectrometry data 70 has been denoised and is ready for further processing. A wavelet transformation of the denoised signal results in the sparse data set 120 as shown in FIG. 9.

Figures 10, 11:
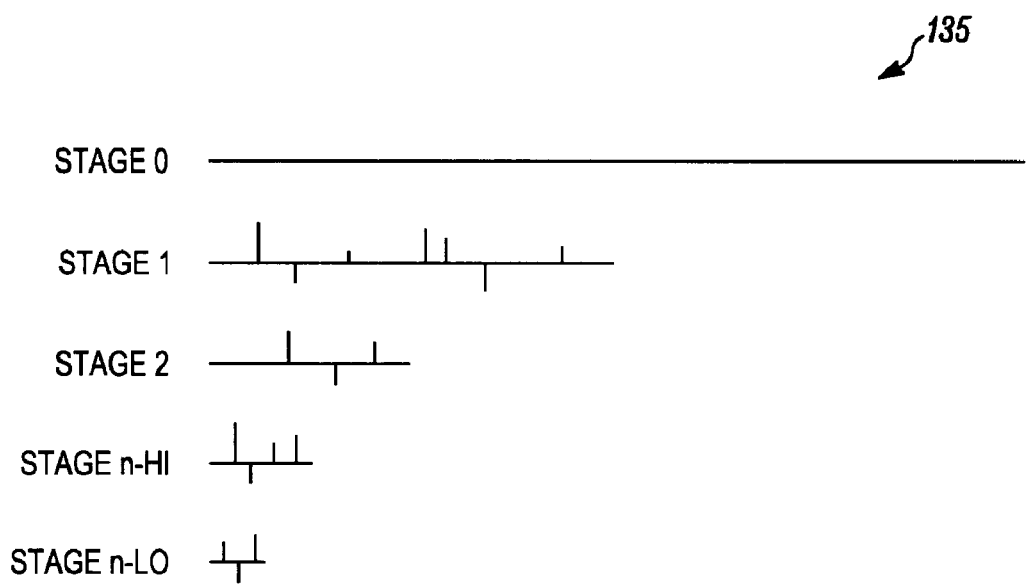
FIG. 10 is a formula for signal shifting.
FIG. 11 is a graphical representation of a wavelet transformation of a denoised and shifted signal.

Referring again to FIG. 2, the mass spectrometry data received in block 40 has been denoised in block 45 and is now passed to block 50 for baseline correction. Before performing baseline correction, the artifacts introduced by the wavelet transformation procedure are preferably removed. Wavelet transformation results vary slightly depending upon which point of the wavelet is used as a starting point. For example, the preferred embodiment uses the 24-point Daubechies-24 wavelet. By starting the transformation at the 0 point of the wavelet, a slightly different result will be obtained than if starting at points 1 or 2 of the wavelet. Therefore, the denoised data is transformed using every available possible starting point, with the results averaged to determine a final denoised and shifted signal. For example, FIG. 10 shows that the wavelet coefficient is applied 24 different times and then the results averaged to generate the final data set. It will be appreciated that other techniques may be used to accommodate the slight error introduced due to wavelet shifting.

Figure 12:
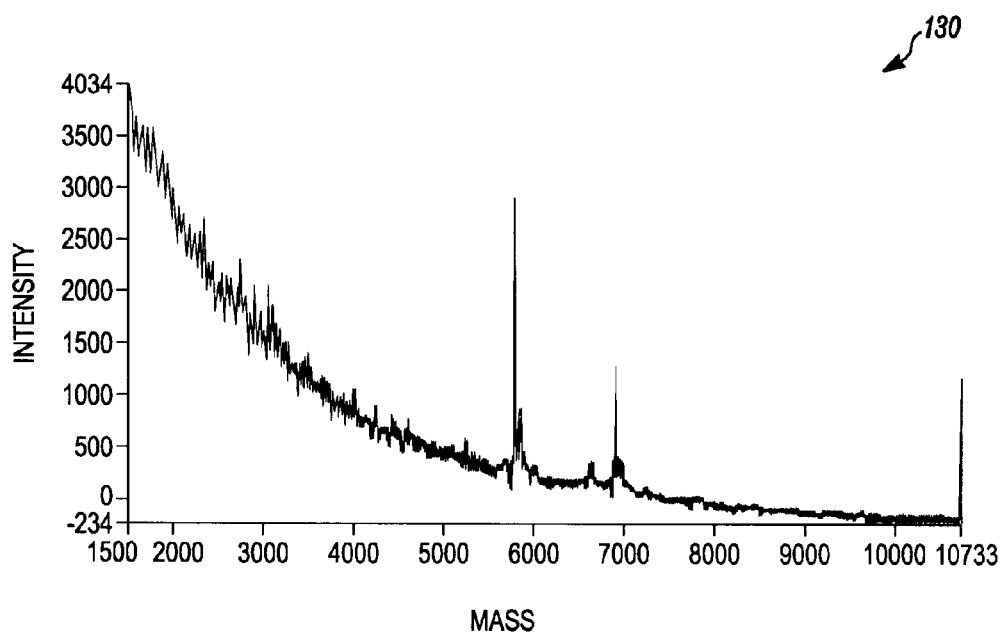
FIG. 12 is a graphical representation of a denoised and shifted signal.

The formula is generally indicated in FIG. 10. Once the signal has been denoised and shifted, a denoised and shifted signal 130 is generated as shown in FIG. 12. FIG. 11 shows an example of the wavelet coefficient 135 data set from the denoised and shifted signal 130.

Figure 13:
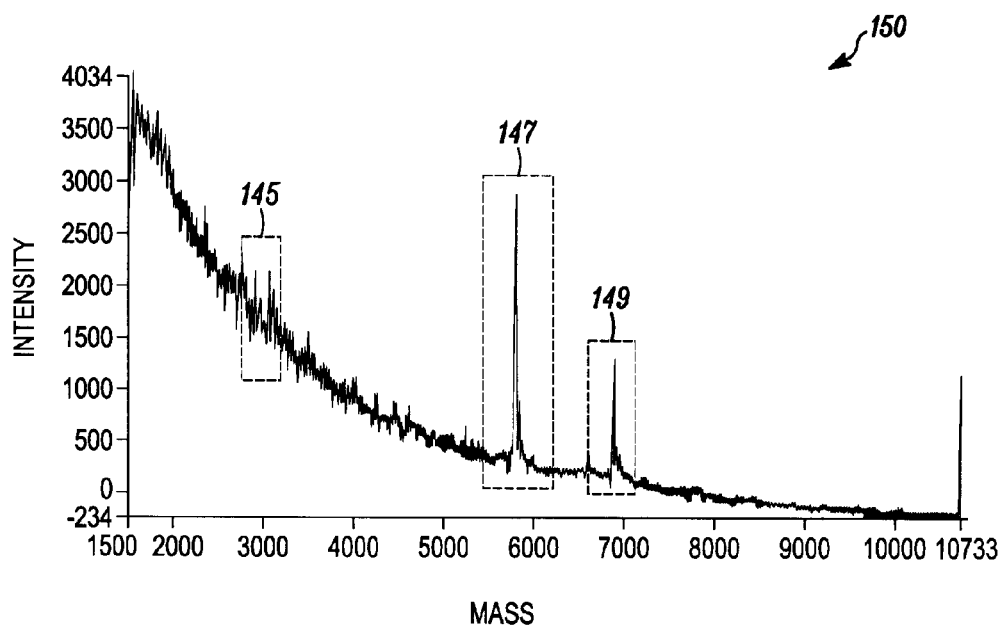
FIG. 13 is a graphical representation of removing peak sections.

FIG. 13 shows that putative peak areas 145, 147, and 149 are located in the denoised and shifted signal 150. The putative peak areas are systematically identified by taking a moving average along the signal 150 and identifying sections of the signal 150 which exceed a threshold related to the moving average. It will be appreciated that other methods can be used to identify putative peak areas in the signal 150.

Figure 14:
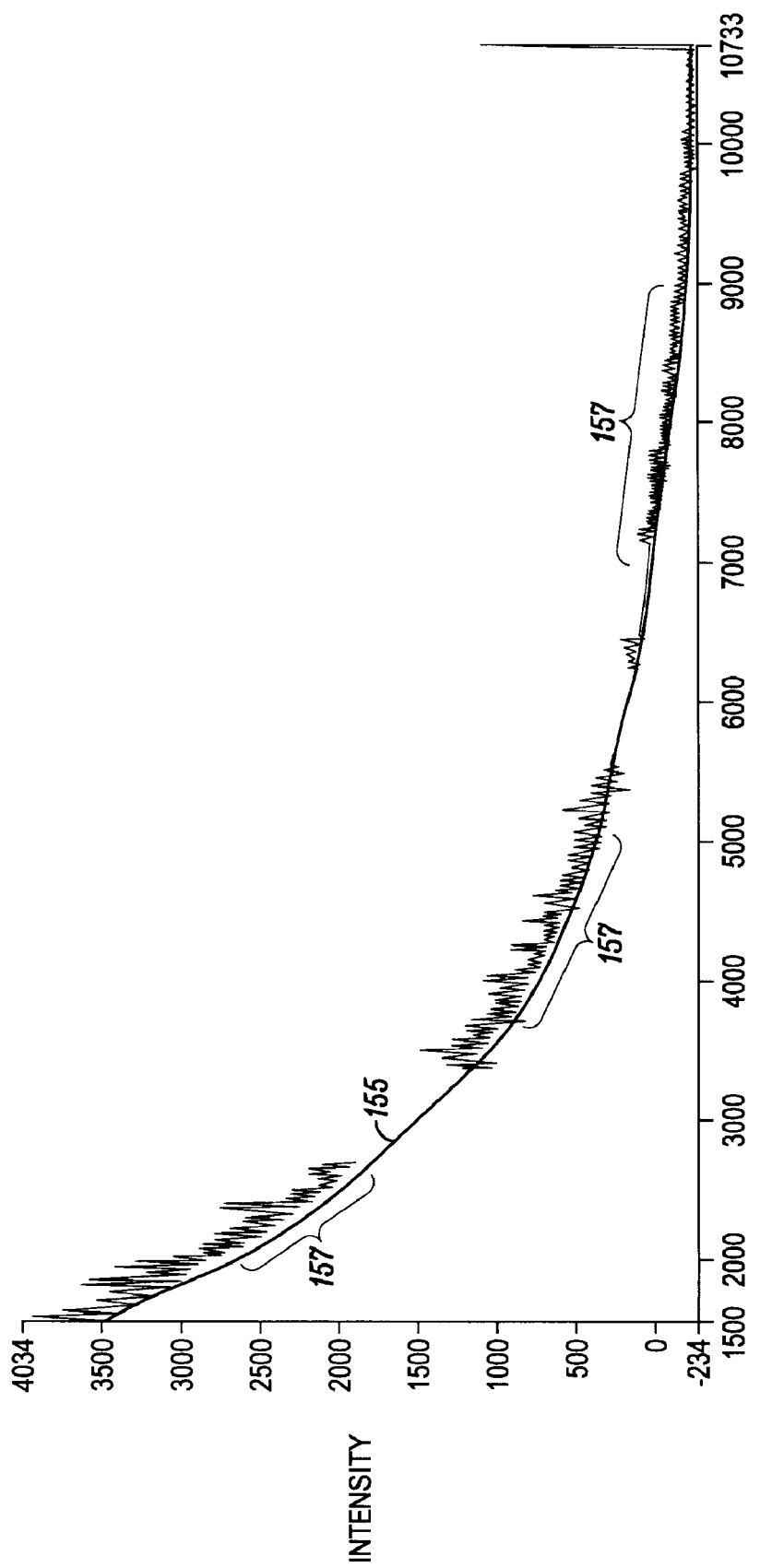
FIG. 14 is a graphical representation of generating a peak free signal.

Putative peak areas 145, 147 and 149 are removed from the signal 150 to create a peak-free signal 155 as shown in FIG. 14. The peak-free signal 155 is further analyzed to identify remaining minimum values 157, and the remaining minimum values 157 are connected to generate the peak-free signal 155.

Figure 15:
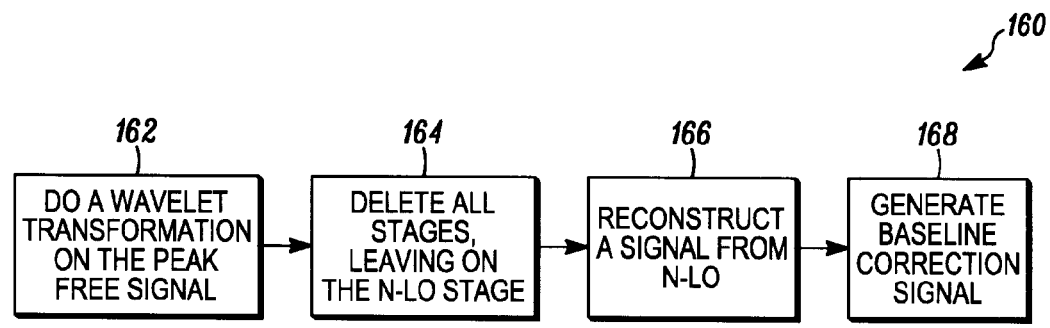
FIG. 15 is a block diagram of a method of generating a baseline correction.
Figure 16:
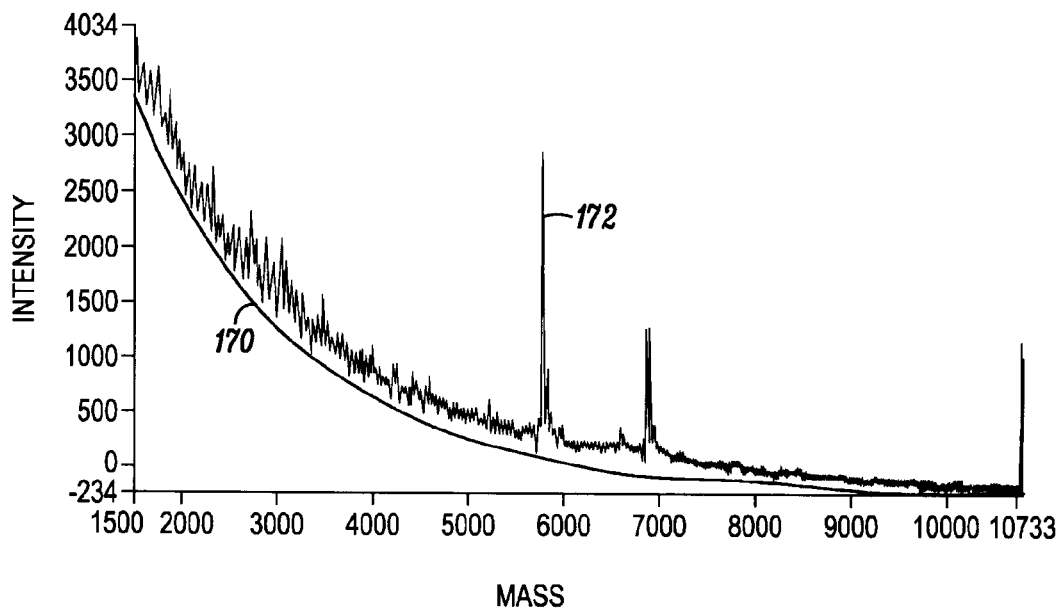
FIG. 16 is a graphical representation of a baseline and signal.

FIG. 15 shows a process of using the peak-free signal 155 to generate a baseline 170 as shown in FIG. 16. As shown in block 162, a wavelet transformation is performed on the peak-free signal 155. All the stages from the wavelet transformation are eliminated in block 164 except for the n low stage. The n low stage will generally indicate the lowest frequency component of the peak-free signal 155 and therefore will generally indicate the system exponential characteristics. Block 166 shows that a signal is reconstructed from the n low coefficients and the baseline signal 170 is generated in block 168.

Figure 17:
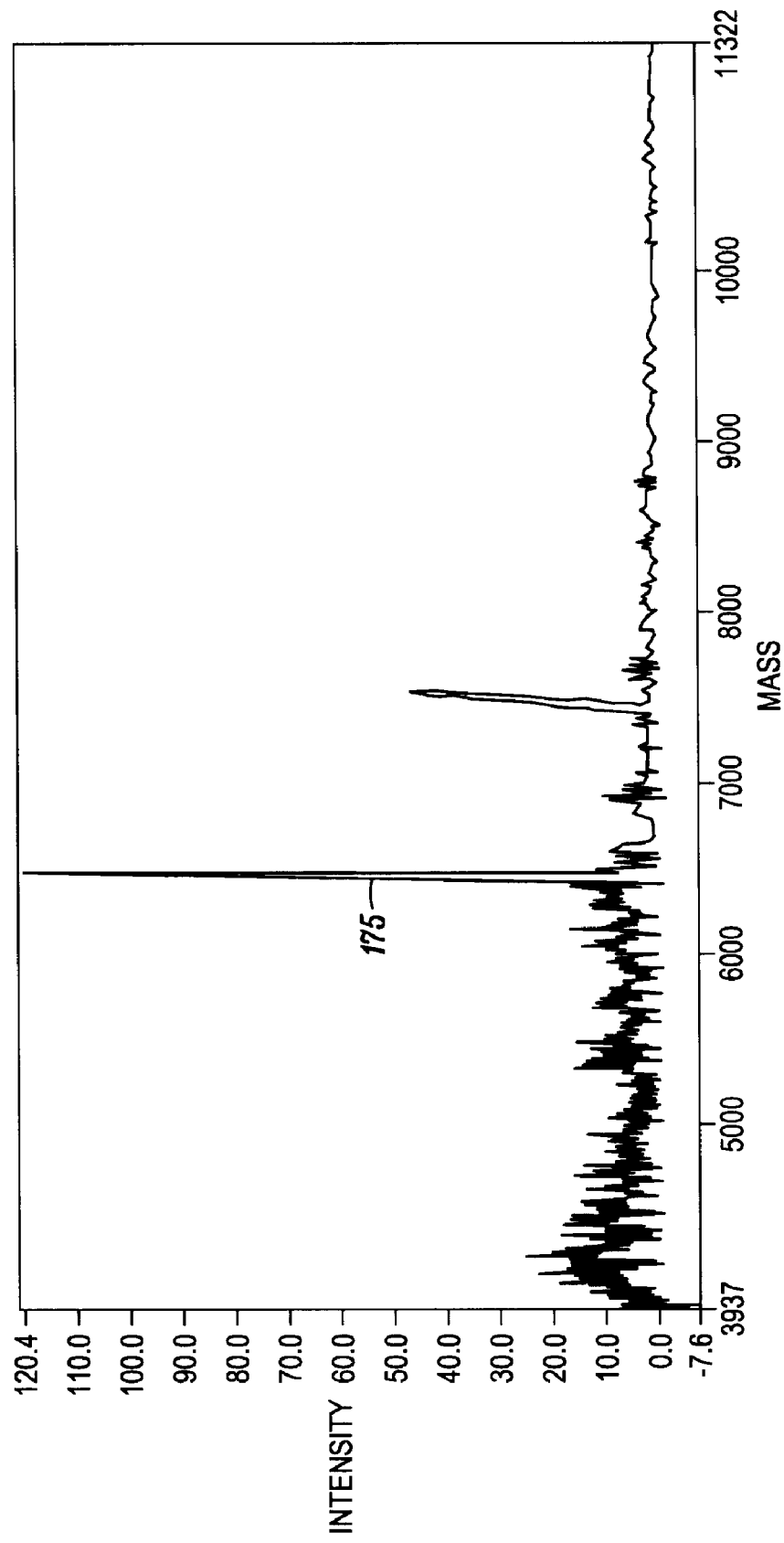
FIG. 17 is a graphical representation of a signal with baseline removed.

FIG. 16 shows a denoised and shifted data signal 172 positioned adjacent a correction baseline 170. The baseline correction 170 is subtracted from the denoised and shifted signal 172 to generate a signal 175 having a baseline correction applied as shown in FIG. 17. Although such a denoised, shifted, and corrected signal is sufficient for most identification purposes, the putative peaks in signal 175 are not identifiable with sufficient accuracy or confidence to call the DNA composition of a biological sample.

Figures 18, 19:
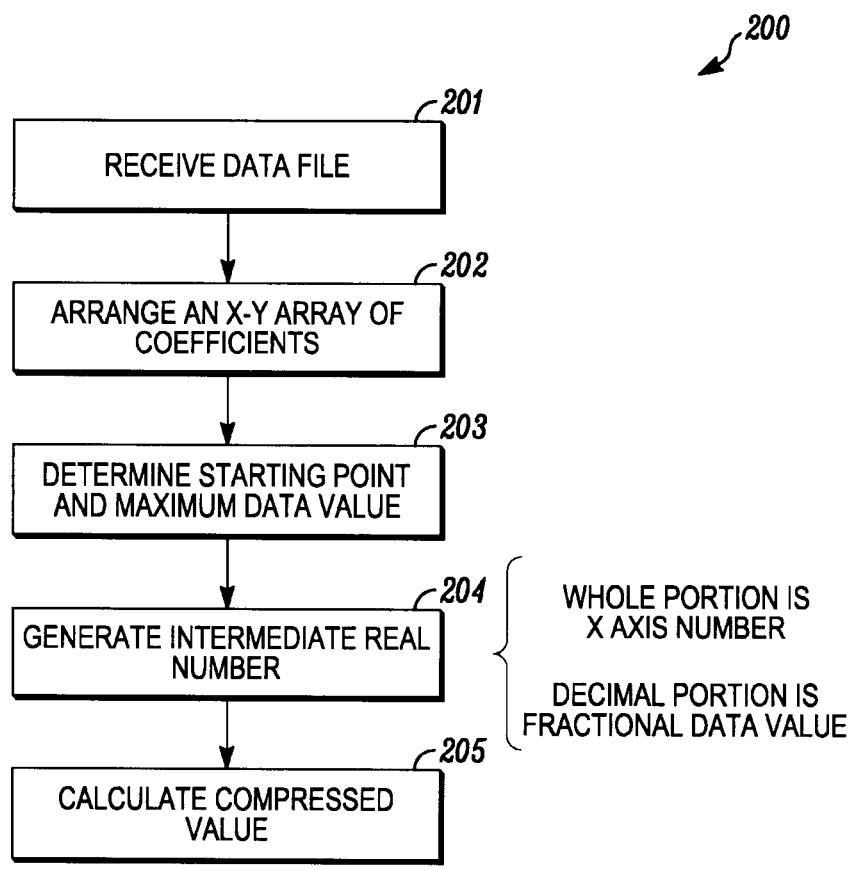
FIG. 18 is a table showing compressed data.
FIG. 19 is a flowchart of method for compressing data.

Referring again to FIG. 2, the data from the baseline correction 50 is now compressed in block 55; the compression technique used in a preferred embodiment is detailed in FIG. 18. In FIG. 18 the data in the baseline corrected data are presented in an array format 182 with x-axis points 183 having an associated data value 184. The x-axis is indexed by the non-zero wavelet coefficients, and the associated value is the value of the wavelet coefficient. In the illustrated data example in table 182, the maximum value 184 is indicated to be 1000. Although a particularly advantageous compression technique for mass spectrometry data is shown, it will be appreciated that other compression techniques can be used. Although not preferred, the data may also be stored without compression.

In compressing the data according to a preferred embodiment, an intermediate format 186 is generated. The intermediate format 186 generally comprises a real number having a whole number portion 188 and a decimal portion 190. The whole number portion is the x-axis point 183 while the decimal portion is the value data 184 divided by the maximum data value. For example, in the data 182 a data value "25" is indicated at x-axis point "100". The intermediate value for this data point would be "100.025".

From the intermediate compressed data 186 the final compressed data 195 is generated. The first point of the intermediate data file becomes the starting point for the compressed data. Thereafter each data point in the compressed data 195 is calculated as follows: the whole number portion (left of the decimal) is replaced by the difference between the current and the last whole number. The remainder (right of the decimal) remains intact. For example, the starting point of the compressed data 195 is shown to be the same as the intermediate data point which is "100.025". The comparison between the first intermediate data point "100.025" and the second intermediate data point "150.220" is "50.220". Therefore, "50.220" becomes the second point of the compressed data 195. In a similar manner, the second intermediate point is "150.220" and the third intermediate data point is "500.0001". Therefore, the third compressed data becomes "350.000". The calculation for determining compressed data points is continued until the entire array of data points is converted to a single array of real numbers.

FIG. 19 generally describes the method of compressing mass spectrometry data, showing that the data file in block 201 is presented as an array of coefficients in block 202. The data starting point and maximum is determined as shown in block 203, and the intermediate real numbers are calculated in block 204 as described above. With the intermediate data points generated, the compressed data is generated in block 205. The described compression method is highly advantageous and efficient for compressing data sets such as a processed data set from a mass spectrometry instrument. The method is particularly useful for data, such as mass spectrometry data, that use large numbers and have been processed to have occasional lengthy gaps in x-axis data. Accordingly, an x-y data array for processed mass spectrometry data may be stored with an effective compression rate of 10× or more. Although the compression technique is applied to mass spectrometry data, it will be appreciated with the method may also advantageously be applied to other data sets.

Figure 20:
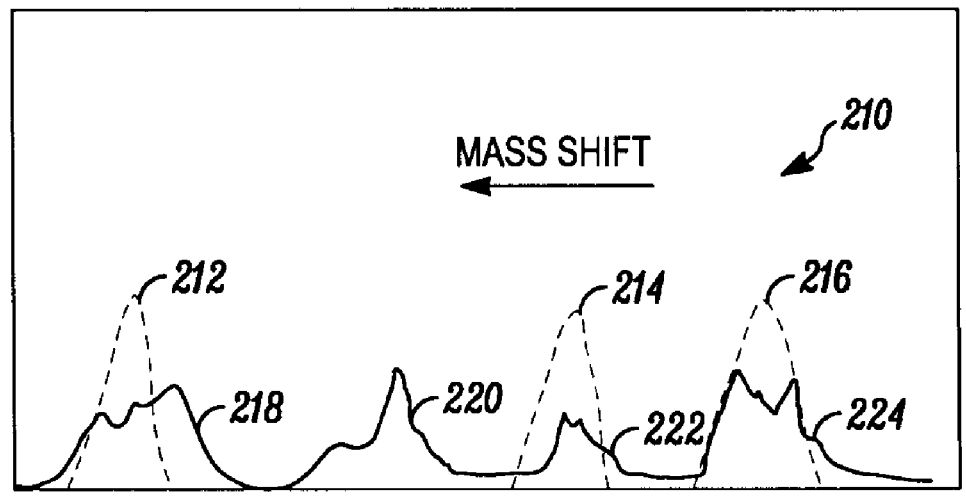
FIG. 20 is a graphical representation of mass shifting.

Referring again to FIG. 2, peak heights are now determined in block 60. The first step in determining peak height is illustrated in FIG. 20 where the signal 210 is shifted left or right to correspond with the position of expected peaks. As the set of possible compositions in the biological sample is known before the mass spectrometry data is generated, the possible positioning of expected peaks is already known. These possible peaks are referred to as expected peaks, such as expected peaks 212, 214, and 216. Due to calibration or other errors in the test instrument data, the entire signal may be shifted left or right from its actual position; therefore, putative peaks located in the signal, such as putative peaks 218, 222, and 224 may be compared to the expected peaks 212, 214, and 216, respectively. The entire signal is then shifted such that the putative peaks align more closely with the expected peaks.

Figure 21:
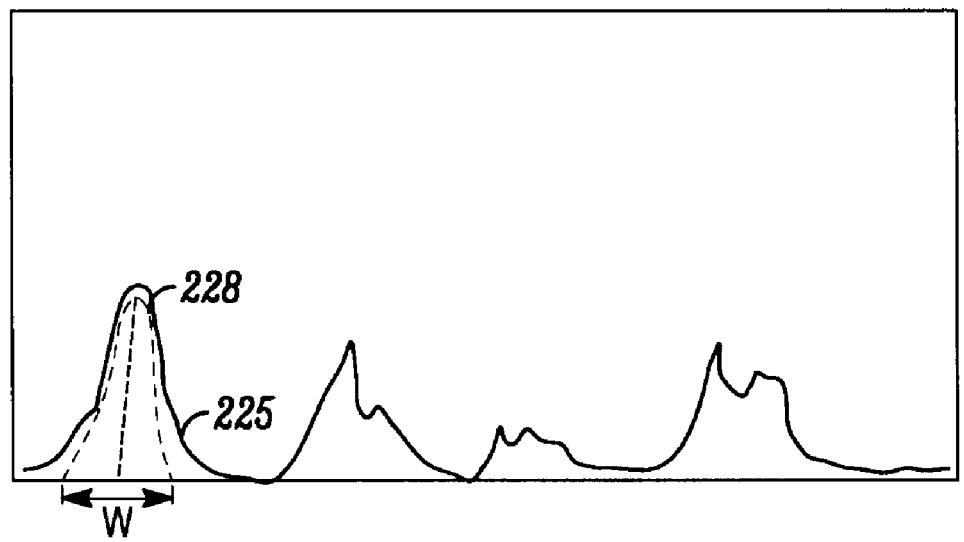
FIG. 21 is a graphical representation of determining peak width.

Once the putative peaks have been shifted to match expected peaks, the strongest putative peak is identified in FIG. 21. In a preferred embodiment, the strongest peak is calculated as a combination of analyzing both the overall peak height and area beneath the peak. For example, a moderately high but wide peak would be stronger than a very high peak that is extremely narrow. With the strongest putative peak identified, such as putative peak 225, a Gaussian 228 curve is fit to the peak 225. Once the Gaussian is fit, the width (W) of the Gaussian is determined and will be used as the peak width for future calculations.

As generally addressed above, the denoised, shifted, and baseline-corrected signal is not sufficiently processed for confidently calling the DNA composition of the biological sample. For example, although the baseline has generally been removed, there are still residual baseline effects present. These residual baseline effects are therefore removed to increase the accuracy and confidence in making identifications.

Figure 22:
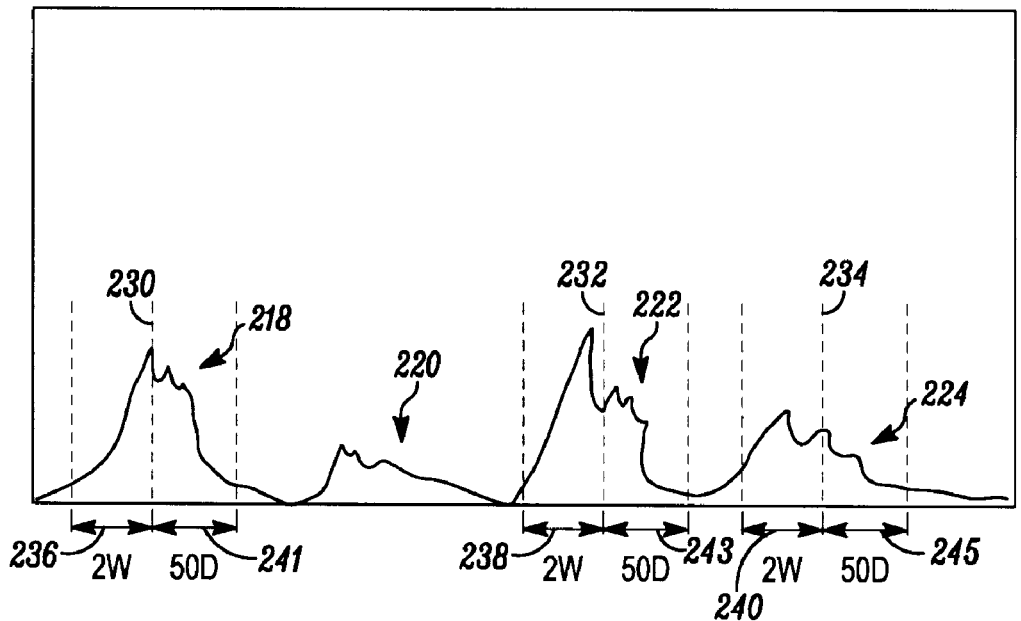
FIG. 22 is a graphical representation of removing peaks.

To remove the residual baseline effects, FIG. 22 shows that the putative peaks 218, 222, and 224 are removed from the baseline corrected signal. The peaks are removed by identifying a center line 230, 232, and 234 of the putative peaks 218, 222, and 224, respectively and removing an area both to the left and to the right of the identified center line. For each putative peak, an area equal to twice the width (W) of the Gaussian is removed from the left of the center line, while an area equivalent to 50 daltons is removed from the right of the center line. It has been found that the area representing 50 daltons is adequate to sufficiently remove the effect of salt adducts which may be associated with an actual peak. Such adducts appear to the right of an actual peak and are a natural effect from the chemistry involved in acquiring a mass spectrum. Although a 50 Dalton buffer has been selected, it will be appreciated that other ranges or methods can be used to reduce or eliminate adduct effects.

Figure 23:
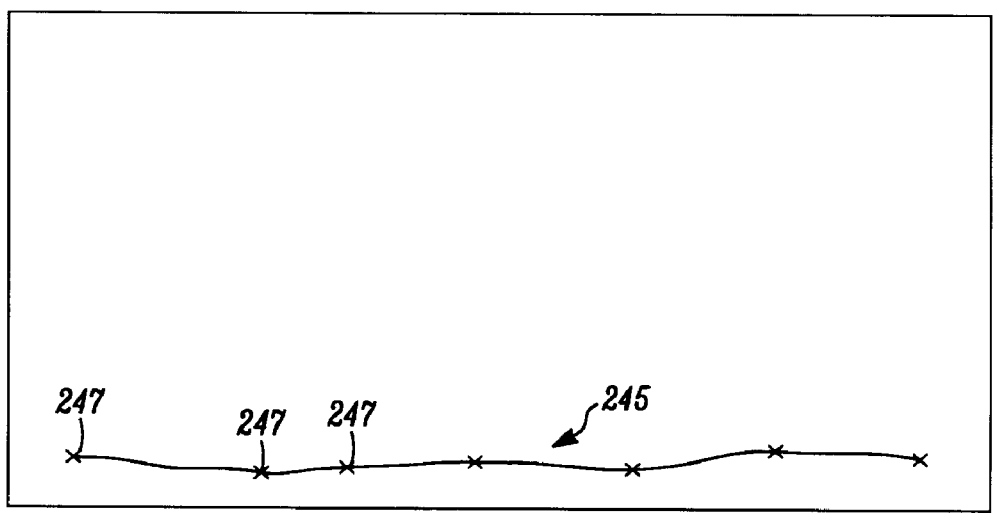
FIG. 23 is a graphical representation of a signal with peaks removed.
Figure 24:
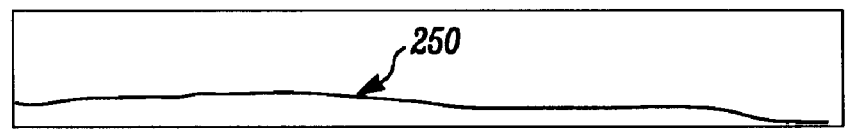
FIG. 24 is a graphical representation of a residual baseline.
Figure 25:
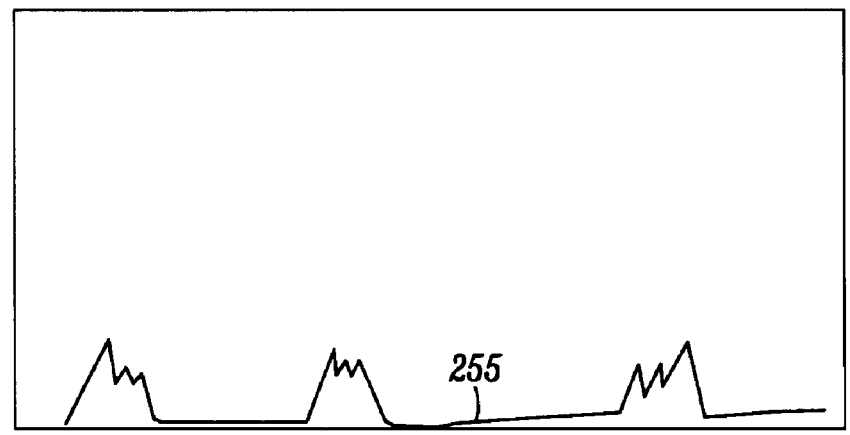
FIG. 25 is a graphical representation of a signal with residual baseline removed.

The peaks are removed and remaining minima 247 located as shown in FIG. 23 with the minima 247 connected to create signal 245. A quartic polynomial is applied to signal 245 to generate a residual baseline 250 as shown in FIG. 24. The residual baseline 250 is subtracted from the signal 225 to generate the final signal 255 as indicated in FIG. 25. Although the residual baseline is the result of a quartic fit to signal 245, it will be appreciated that other techniques can be used to smooth or fit the residual baseline.

Figure 26:
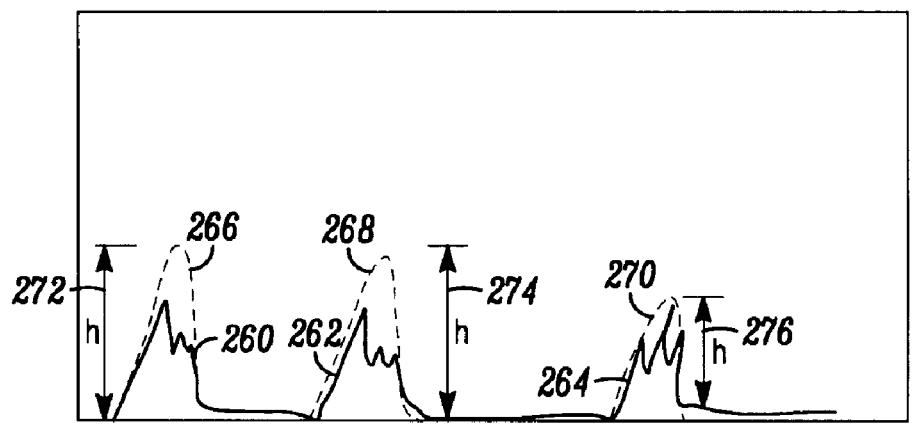
FIG. 26 is a graphical representation of determining peak height.

To determine peak height, as shown in FIG. 26, a Gaussian such as Gaussian 266, 268, and 270 is fit to each of the peaks, such as peaks 260, 262, and 264, respectively. Accordingly, the height of the Gaussian is determined as height 272, 274, and 276. Once the height of each Gaussian peak is determined, then the method of identifying a biological compound 35 can move into the genotyping phase 65 as shown in FIG. 2.

Figure 27:
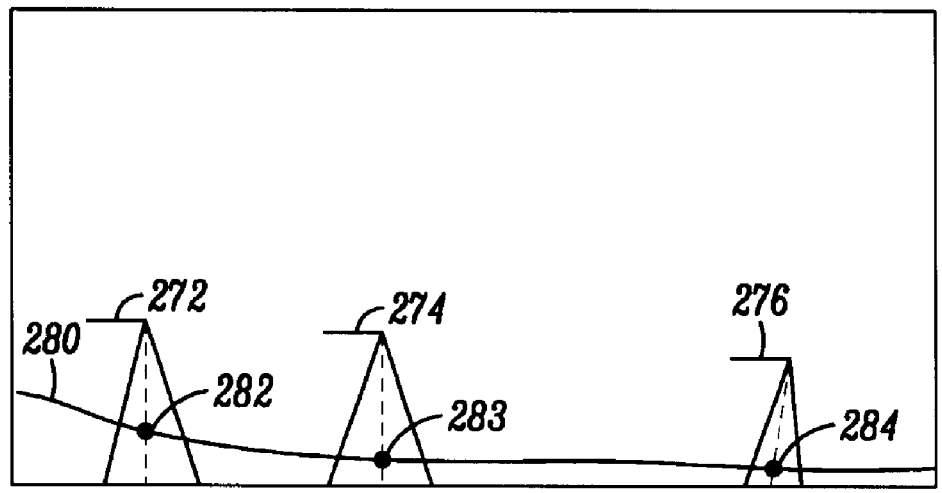
FIG. 27 is a graphical representation of determining signal-to-noise for each peak.

An indication of the confidence that each putative peak is an actual peak can be discerned by calculating a signal-to-noise ratio for each putative peak. Accordingly, putative peaks with a strong signal-to-noise ratio are generally more likely to be an actual peak than a putative peak with a lower signal-to-noise ratio. As described above and shown in FIG. 27, the height of each peak, such as height 272, 274, and 276, is determined for each peak, with the height being an indicator of signal strength for each peak. The noise profile, such as noise profile 97, is extrapolated into noise profile 280 across the identified peaks. At the center line of each of the peaks, a noise value is determined, such as noise value 282, 283, and 284. With a signal value and a noise value generated, signal-to-noise ratios can be calculated for each peak. For example, the signal-to-noise ratio for the first peak in FIG. 27 would be calculated as signal value 272 divided by noise value 282, and in a similar manner the signal-to-noise ratio of the middle peak in FIG. 27 would be determined as signal 274 divided by noise value 283.

Although the signal-to-noise ratio is generally a useful indicator of the presence of an actual peak, further processing has been found to increase the confidence by which a sample can be identified. For example, the signal-to-noise ratio for each peak in the preferred embodiment is preferably adjusted by the goodness of fit between a Gaussian and each putative peak. It is a characteristic of a mass spectrometer that sample material is detected in a manner that generally complies with a normal distribution. Accordingly, greater confidence will be associated with a putative signal having a Gaussian shape than a signal that has a less normal distribution. The error resulting from having a non-Gaussian shape can be referred to as a "residual error".

Figure 28:
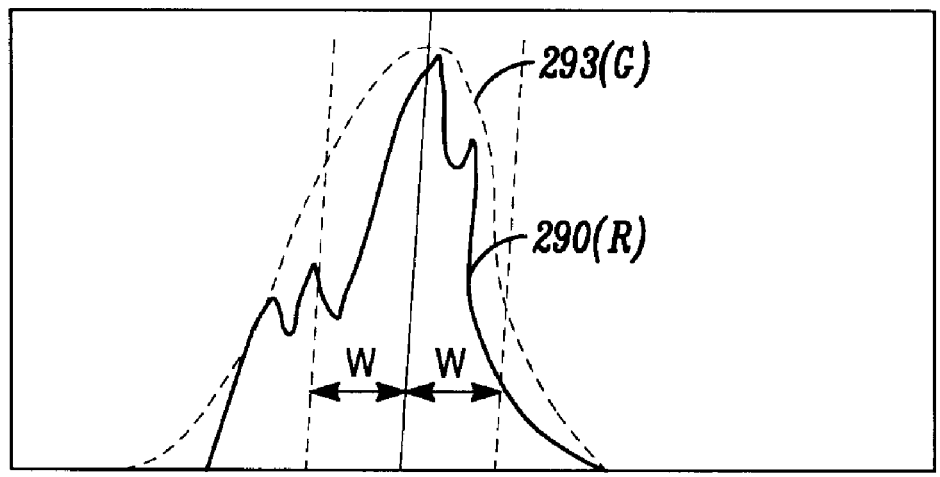
FIG. 28 is a graphical representation of determining a residual error for each peak.

Referring to FIG. 28, a residual error is calculated by taking a root mean square calculation between the Gaussian 293 and the putative peak 290 in the data signal. The calculation is performed on data within one width on either side of a center line of the Gaussian. The residual error is calculated as:

$$\frac{\sqrt{(G-R)^2}}{N}$$

where G is the Gaussian signal value, R is the putative peak value, and N is the number of points from −W to +W. The calculated residual error is used to generate an adjusted signal-to-noise ratio, as described below.

An adjusted signal noise ratio is calculated for each putative peak using the formula $(S/N)*EXP^{(-0.1*R)}$, where S/N is the signal-to-noise ratio, and R is the residual error determined above. Although the preferred embodiment calculates an adjusted signal-to-noise ratio using a residual error for each peak, it will be appreciated that other techniques can be used to account for the goodness of fit between the Gaussian and the actual signal.

Figure 29:
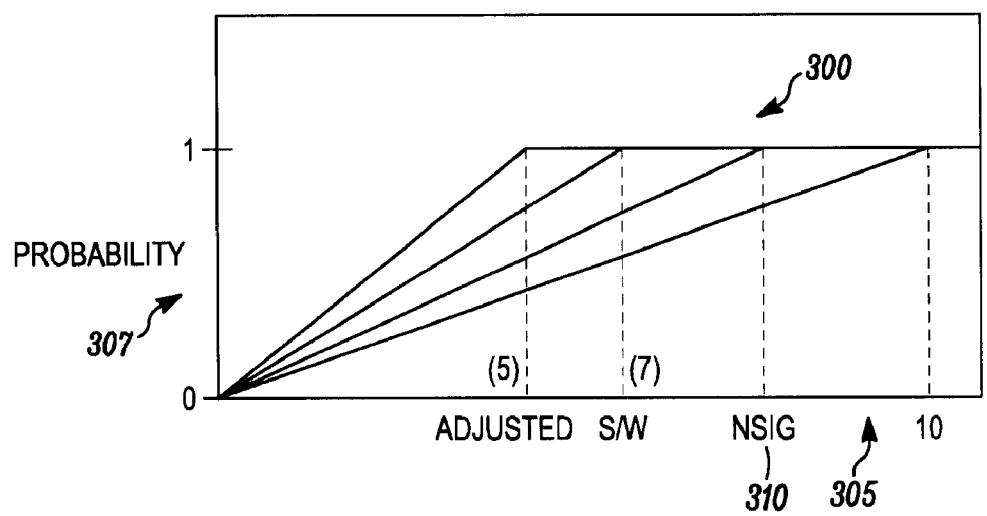
FIG. 29 is a graphical representation of peak probabilities.

Referring now to FIG. 29, a probability is determined that a putative peak is an actual peak. In making the determination of peak probability, a probability profile 300 is generated where the adjusted signal-to-noise ratio is the x-axis and the probability is the y-axis. Probability is necessarily in the range between a 0% probability and a 100% probability, which is indicated as 1. Generally, the higher the adjusted signal-to-noise ratio, the greater the confidence that a putative peak is an actual peak.

At some target value for the adjusted signal-to-noise, it has been found that the probability is 100% that the putative peak is an actual peak and can confidently be used to identify the DNA composition of a biological sample. However, the target value of adjusted signal-to-noise ratio where the probability is assumed to be 100% is a variable parameter which is to be set according to application specific criteria. For example, the target signal-to-noise ratio will be adjusted depending upon trial experience, sample characteristics, and the acceptable error tolerance in the overall system. More specifically, for situations requiring a conservative approach where error cannot be tolerated, the target adjusted signal-to-noise ratio can be set to, for example, 10 and higher. Accordingly, 100% probability will not be assigned to a peak unless the adjusted signal-to-noise ratio is 10 or over.

In other situations, a more aggressive approach may be taken as sample data are more pronounced or the risk of error may be reduced. In such a situation, the system may be set to assume a 100% probability with a 5 or greater target signal-to-noise ratio. Of course, an intermediate signal-to-noise ratio target figure can be selected, such as 7, when a moderate risk of error can be assumed. Once the target adjusted signal-to-noise ratio is set for the method, then for any adjusted signal-to-noise ratio a probability can be determined that a putative peak is an actual peak.

Figure 30:
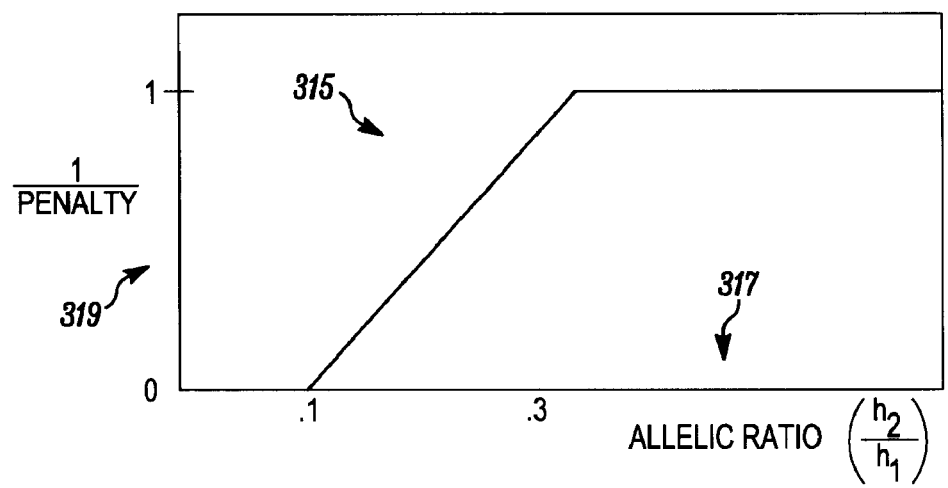
FIG. 30 is a graphical representation of applying an allelic ratio to peak probability.

Due to the chemistry involved in performing an identification test, especially a mass spectrometry test of a sample prepared by DNA amplifications, the allelic ratio between the signal strength of the highest peak and the signal strength of the second (or third and so on) highest peak should fall within an expected ratio. If the allelic ratio falls outside of normal guidelines, the preferred embodiment imposes an allelic ratio penalty to the probability. For example, FIG. 30 shows an allelic penalty 315 which has an x-axis 317 that is the ratio between the signal strength of the second highest peak divided by signal strength of the highest peak. The y-axis 319 assigns a penalty between 0 and 1 depending on the determined allelic ratio. In the preferred embodiment, it is assumed that allelic ratios over 30% are within the expected range and therefore no penalty is applied. Between a ratio of 10% and 30%, the penalty is linearly increased until at allelic ratios below 10% it is assumed the second-highest peak is not real. For allelic ratios between 10% and 30%, the allelic penalty chart 315 is used to determine a penalty 319, which is multiplied by the peak probability determined in FIG. 29 to determine a final peak probability. Although the preferred embodiment incorporates an allelic ratio penalty to account for a possible chemistry error, it will be appreciated that other techniques may be used. Similar treatment will be applied to the other peaks.

Figure 31:
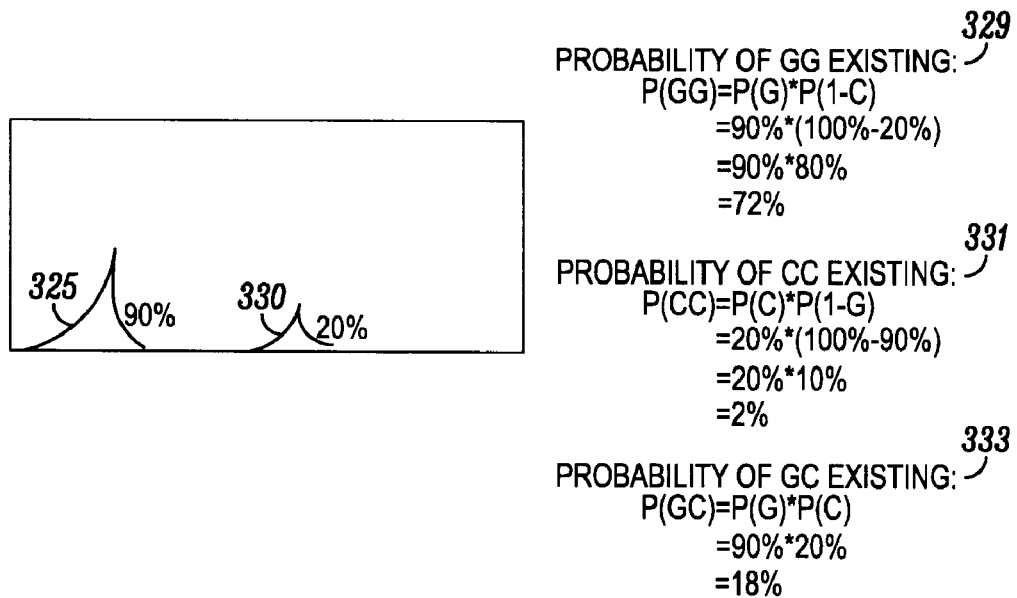
FIG. 31 is a graphical representation of determining peak probability

With the peak probability of each peak determined, the statistical probability for various composition components may be determined, as an example, in order to determine the probability of each of three possible combinations of two peaks, —peak G, peak C and combinations GG, CC and GC. FIG. 31 shows an example where a most probable peak 325 is determined to have a final peak probability of 90%. Peak 325 is positioned such that it represents a G component in the biological sample. Accordingly, it can be maintained that there is a 90% probability that G exists in the biological sample. Also in the example shown in FIG. 31, the second highest probability is peak 330 which has a peak probability of 20%. Peak 330 is at a position associated with a C composition. Accordingly, it can be maintained that there is a 20% probability that C exists in the biological sample.

With the probability of G existing (90%) and the probability of C existing (20%) as a starting point, the probability of combinations of G and C existing can be calculated. For example, FIG. 31 indicates that the probability of GG existing 329 is calculated as 72%. This is calculated as the probability of GG is equal to the probability of G existing (90%) multiplied by the probability of C not existing (100%-20%). So if the probability of G existing is 90% and the probability of C not existing is 80%, the probability of GG is 72%.

In a similar manner, the probability of CC existing is equivalent to the probability of C existing (20%) multiplied by the probability of G not existing (100%-90%). As shown in FIG. 31, the probability of C existing is 20% while the probability of G not existing is 10%, so therefore the probability of CC is only 2%. Finally, the probability of GC existing is equal to the probability of G existing (90%) multiplied by the probability of C existing (20%). So if the probability of G existing is 90% and the probability of C existing is 20%, the probability of GC existing is 18%. In summary form, then, the probability of the composition of the biological sample is:

| | |
|---|---|
| probability of GG: | 72%; |
| probability of GC: | 18%; and |
| probability of CC: | 2%. |

Figure 32:
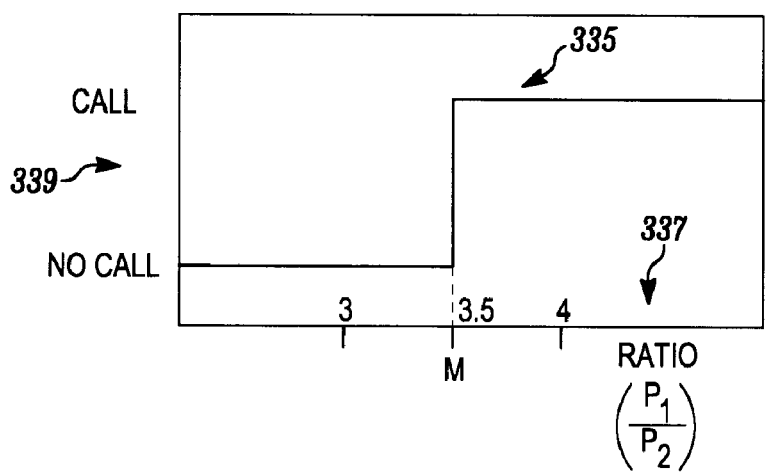
FIG. 32 is a graphical representation of calling a genotype.

Once the probabilities of each of the possible combinations has been determined, FIG. 32 is used to decide whether or not sufficient confidence exists to call the genotype. FIG. 32 shows a call chart 335 which has an x-axis 337 which is the ratio of the highest combination probability to the second highest combination probability. The y-axis 339 simply indicates whether the ratio is sufficiently high to justify calling the genotype. The value of the ratio may be indicated by M. The value of M is set depending upon trial data, sample composition, and the ability to accept error. For example, the value M may be set relatively high, such as to a value 4 so that the highest probability must be at least four times greater than the second highest probability before confidence is established to call a genotype. However, if a certain level of error may be acceptable, the value of M may be set to a more aggressive value, such as to 3, so that the ratio between the highest and second highest probabilities needs to be only a ratio of 3 or higher. Of course, moderate value may be selected for M when a moderate risk can be accepted. Using the example of FIG. 31, where the probability of GG was 72% and the probability of GC was 18%, the ratio between 72% and 18% is 4.0; therefore, whether M is set to 3, 3.5, or 4, the system would call the genotype as GG. Although the preferred embodiment uses a ratio between the two highest peak probabilities to determine if a genotype confidently can be called, it will be appreciated that other methods may be substituted. It will also be appreciated that the above techniques may be used for calculating probabilities and choosing genotypes (or more general DNA patterns) consisting of combinations of more than two peaks.

Figure 33:
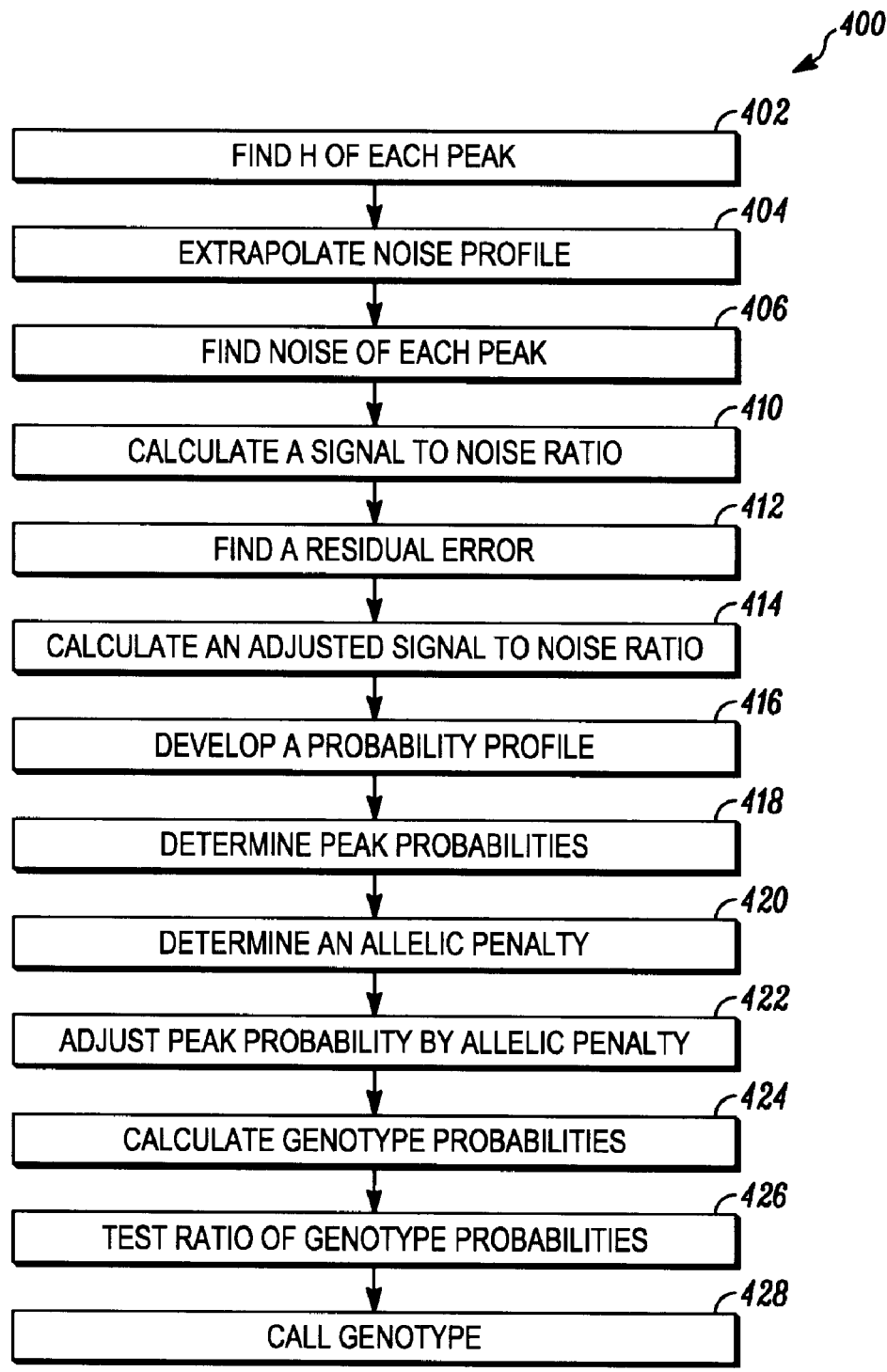
FIG. 33 is a flowchart showing a statistical procedure for calling a genotype.

Referring now to FIG. 33, a flow chart is shown generally defining the process of statistically calling genotype described above. In FIG. 33 block 402 shows that the height of each peak is determined and that in block 404 a noise profile is extrapolated for each peak. The signal is determined from the height of each peak in block 402 and the noise for each peak is determined using the noise profile in block 406. In block 410, the signal-to-noise ratio is calculated for each peak. To account for a non-Gaussian peak shape, a residual error is determined in block 412 and an adjusted signal-to-noise ratio is calculated in block 414. Block 416 shows that a probability profile is developed, with the probability of each peak existing found in block 418. An allelic penalty may be applied in block 420, with the allelic penalty applied to the adjusted peak probability in block 422. The probability of each combination of components is calculated in block 424 with the ratio between the two highest probabilities being determined in block 426. If the ratio of probabilities exceeds a threshold value, then the genotype is called in block 428.

One skilled in the art will appreciate that the present invention can be practiced by other than the preferred embodiments which are presented in this description for purposes of illustration and not of limitation, and the present invention is limited only by the claims which follow. It is noted that equivalents for the particular embodiments discussed in this description may practice the invention as well.

What is claimed is:

1. An automated method for identifying a component in a DNA sample, comprising:
   using a mass spectrometer to generate a computer readable data set comprising data representing components in the biological sample for analysis by a computer, and using the computer to:
   denoise the data set to generate denoised data;
   correct a baseline from the denoised data to generate an intermediate data set, the intermediate data set having a plurality of data values associated with respective points in an array of data;
   compress the intermediate data set to obtain compressed data;
   define putative peaks in the compressed data, wherein the putative peaks represent components in the DNA sample;
   generate a residual baseline by removing the putative peaks from the compressed data;
   remove the residual baseline from the compressed data to generate a corrected data set;
   locate a putative peak in the corrected data set; and
   identify the component that corresponds to the located putative peak;
   wherein the compressed data comprises compressed data points and wherein a compressed data point is a real number that includes a whole number portion that is determined by calculating the difference between the whole number portions of two consecutive points in the array of data.

2. An automated method for identifying a component in a DNA sample, comprising:
   using a mass spectrometer to generate a computer readable data set comprising data representing components in the biological sample for analysis by a computer, and using the computer to:
   denoise the data set to generate denoised data;
   correct a baseline from the denoised data to generate an intermediate data set, the intermediate data set having a plurality of data values associated with respective points in an array of data;
   compress the intermediate data set to obtain compressed data;
   define putative peaks in the compressed data, wherein the putative peaks represent components in the DNA sample;
   generate a residual baseline by removing the putative peaks from the compressed data;
   remove the residual baseline from the compressed data to generate a corrected data set;
   locate a putative peak in the corrected data set; and
   identify the component that corresponds to the located putative peak;
   wherein the compressed data comprises compressed data points and wherein a compressed data point is a real number that includes a decimal portion representing the difference between a maximum value of all the data values and a value at a particular point in the array.

3. An automated method for identifying a component in a DNA sample, comprising:
   using a mass spectrometer to generate a computer readable data set comprising data representing components in the biological sample for analysis by a computer, and using the computer to:
   denoise the data set to generate denoised data;
   correct a baseline from the denoised data to generate an intermediate data set;
   define putative peaks in the intermediate data set, wherein the putative peaks represent components in the DNA sample;
   generate a residual baseline by removing the putative peaks from the intermediate data set, comprising the steps of
      a) identifying the center line of each putative peak;
      b) removing an area to the right of the center line of each putative peak; and
      c) removing an area equal to twice the width of the Gaussian curve fit to each putative peak from the left of the center line of each putative peak;
   remove the residual baseline from the intermediate data set to generate a corrected data set;
   locate a putative peak in the corrected data set; and
   identify the component that corresponds to the located putative peak.

4. An automated method for identifying a component in a DNA sample, comprising:
 using a mass spectrometer to generate a computer readable data set comprising data representing components in the biological sample for analysis by a computer, and using the computer to:
 denoise the data set to generate denoised data;
 correct a baseline from the denoised data to generate an intermediate data set;
 define putative peaks in the intermediate data set, wherein the putative peaks represent components in the DNA sample;
 generate a residual baseline by removing the putative peaks from the intermediate data set, comprising the steps of
  a) identifying the center line of each putative peak;
  b) removing an area equal to the area corresponding to 50 Daltons along the x-axis to the right of the center line of each putative peak; and
  c) removing an area to the left of the center line of each putative peak;
 remove the residual baseline from the intermediate data set to generate a corrected data set;
 locate a putative peak in the corrected data set; and
 identify the component that corresponds to the located putative peak.

5. The method of claim 1, 2, 3, or 4 further comprising:
 determining a peak probability for the putative peak; and
 multiplying the peak probability by an allelic penalty to obtain a final peak probability.

6. The method of claim 1, 2, 3, or 4 further comprising:
 calculating a peak probability that a putative peak in the corrected data is a peak indicating composition of the DNA sample;
 calculating a peak probability for each of a plurality of putative peaks in the corrected data; and comparing the highest peak probability is to a second-highest peak probability to generate a calling ratio.

7. The method according to claim 6 wherein the calling ratio is used to determine if the composition of the DNA sample will be called.

8. The method according to claim 5, wherein the peak probability is determined from a probability profile.

9. The method according to claim 5, comprising determining an allelic ratio, wherein the allelic ratio is a comparison of two peak heights in the corrected data, and assigning the allelic penalty to the allelic ratio.

* * * * *